US012633223B2

(12) United States Patent
Maeda et al.

(10) Patent No.: US 12,633,223 B2
(45) Date of Patent: May 19, 2026

(54) INFORMATION PROCESSING METHOD, INFORMATION PROCESSING PROGRAM, AND INFORMATION PROCESSING DEVICE

(71) Applicant: Sony Group Corporation, Tokyo (JP)

(72) Inventors: Keisuke Maeda, Tokyo (JP); Shinichi Iriya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 87 days.

(21) Appl. No.: 18/707,613

(22) PCT Filed: Oct. 27, 2022

(86) PCT No.: PCT/JP2022/040116
§ 371 (c)(1),
(2) Date: May 6, 2024

(87) PCT Pub. No.: WO2023/085109
PCT Pub. Date: May 19, 2023

(65) Prior Publication Data
US 2025/0006060 A1     Jan. 2, 2025

(30) Foreign Application Priority Data
Nov. 15, 2021     (JP) ................................. 2021-185813

(51) Int. Cl.
G08G 5/32          (2025.01)
G05D 1/229        (2024.01)
(Continued)

(52) U.S. Cl.
CPC .............. G08G 5/32 (2025.01); G05D 1/229 (2024.01); G05D 1/46 (2024.01); G05D 2109/20 (2024.01)

(58) Field of Classification Search
CPC .. G08G 5/32; G08G 5/22; G08G 5/24; G08G 5/26; G08G 5/27; G08G 5/57; G08G 5/59;
(Continued)

(56) References Cited

U.S. PATENT DOCUMENTS 8,712,744 B1 *   4/2014   Sampigethaya ......... G08G 5/00
                                                         701/16
2016/0358480 A1 * 12/2016   Kang ....................... G08G 5/34
(Continued)

FOREIGN PATENT DOCUMENTS

JP          2003-130674 A      5/2003
JP          2014-016264 A      1/2014
(Continued)

OTHER PUBLICATIONS

Machine Translation of JP2014016264 retrieved from Espacenet on Sep. 27, 2025 (Year: 2025).*
(Continued)

*Primary Examiner* — Thomas Ingram
(74) *Attorney, Agent, or Firm* — XSENSUS LLP

(57)          ABSTRACT

An information processing method executed by one processor or executed by a plurality of processors in cooperation, the method includes: an acquisition step of acquiring operation information for one or a plurality of 3D blocks selected from among a plurality of virtual 3D blocks in which different trajectories of a flight vehicle are preset; a generation step of executing connection processing or synthesis processing of two or more 3D blocks on the basis of the operation information; and an output step of outputting information of a flight path of the flight vehicle generated by the processing.

20 Claims, 22 Drawing Sheets

(51) Int. Cl.
    *G05D 1/46*     (2024.01)
    *G05D 109/20*     (2024.01)

(58) Field of Classification Search
    CPC ...... G05D 1/229; G05D 1/46; G05D 2109/20;
                                  G06F 3/04815
    See application file for complete search history.

(56)                References Cited

U.S. PATENT DOCUMENTS

| | | |
|---|---|---|
| 2017/0076612 A1 | 3/2017 | Takahashi |
| 2021/0278834 A1 | 9/2021 | Kendoul |
| 2024/0133693 A1* | 4/2024 | Ali ........................... G08G 5/55 |

FOREIGN PATENT DOCUMENTS

| | | |
|---|---|---|
| JP | 2017-001661 A | 1/2017 |
| JP | 2019-066381 A | 4/2019 |
| JP | 2020-205122 A | 12/2020 |

OTHER PUBLICATIONS

International Search Report and Written Opinion mailed on Jan. 17, 2023, received for PCT Application PCT/JP2022/040116, filed on Oct. 27, 2022, 10 pages including English Translation.

* cited by examiner

TIME-SERIES DISPLAY AREA

LIST DISPLAY AREA

3D SPACE DISPLAY AREA

LIST DISPLAY AREA

3D SPACE DISPLAY AREA　　　TIME-SERIES DISPLAY AREA

LIST DISPLAY AREA

ENLARGE AND REDUCE

ROTATE

MOVE

SYNTHESIZE

INFORMATION PROCESSING METHOD, INFORMATION PROCESSING PROGRAM, AND INFORMATION PROCESSING DEVICE

CROSS-REFERENCE TO RELATED APPLICATIONS

The present application is based on PCT filing PCT/JP2022/040116, filed Oct. 27, 2022, which claims priority to Japanese Patent Application No. 2021-185813, filed Nov. 15, 2021, the entire contents of each are incorporated herein by reference.

FIELD

The present disclosure relates to an information processing method, an information processing program, and an information processing device.

BACKGROUND

Unmanned aerial vehicles such as drones have been actively developed. In recent years, in order to cause a flight vehicle to fly even in an area in which an operator cannot visually recognize the flight vehicle, technology developed has been carried out to enable a user to set a flight path of the flight vehicle in advance.

CITATION LIST

Patent Literature

Patent Literature 1: JP 2019-66381 A

SUMMARY

Technical Problem

Generally, a user uses a two-dimensional screen to input a flight path of a flight vehicle. However, in many cases, a flight path of a flight vehicle has a three-dimensional trajectory. It takes time for a user to input a flight path in three dimensions using a two-dimensional screen since, for example, an operation of viewpoint conversion is required. It is not easy to generate a flight path of a flight vehicle.

Therefore, the present disclosure proposes an information processing method, an information processing device, and an information processing program capable of easily generating a flight path of a flight vehicle.

Note that the above problem or object is merely one of a plurality of problems or objects that can be solved or achieved by a plurality of embodiments disclosed herein.

Solution to Problem

In order to solve the above problem, an information processing method according to one embodiment of the present disclosure executed by one processor or executed by a plurality of processors in cooperation, the method comprising: an acquisition step of acquiring operation information for one or a plurality of 3D blocks selected from among a plurality of virtual 3D blocks in which different trajectories of a flight vehicle are preset; a generation step of executing connection processing or synthesis processing of two or more 3D blocks on a basis of the operation information; and an output step of outputting information of a flight path of the flight vehicle generated by the processing.

DESCRIPTION OF EMBODIMENTS

Figure 1A:
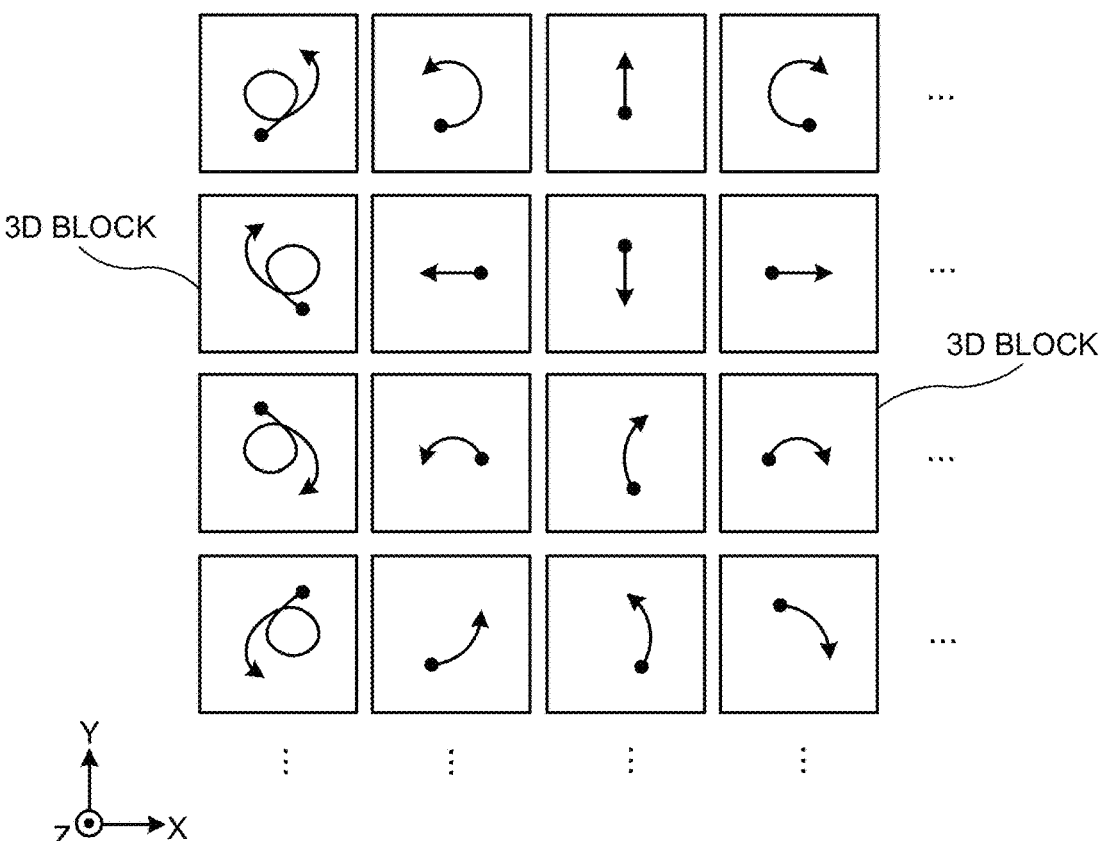
FIG. 1A is a diagram illustrating virtual 3D blocks in which a trajectory of a flight vehicle is preset.

Hereinafter, embodiments of the present disclosure will be described in detail on the basis of the drawings. Note that in each of the following embodiments, the same parts are denoted by the same symbol, and redundant description will be omitted.

Note that, in the present specification and the drawings, a plurality of components having substantially the same functional configuration may be distinguished by attaching different numerals after the same symbol. For example, a plurality of components having substantially the same functional configuration is distinguished as terminal devices $20_1$ and $20_2$, as necessary. However, in a case where it is not particularly necessary to distinguish each of a plurality of components having substantially the same functional configuration, only the same symbol is attached. For example, in a case where it is not necessary to particularly distinguish between the terminal devices $20_1$ and $20_2$, they are simply referred to as the terminal devices 20.

One or a plurality of embodiments (including examples and modifications) described below can be each implemented independently. Meanwhile, at least a part of the plurality of embodiments described below may be combined with and implemented together with at least a part of another embodiment as desired. The plurality of embodiments may include novel features different from each other. Therefore, the plurality of embodiments can contribute to solving different objects or disadvantages or achieve different effects.

The present disclosure will be described in the following order of items.

1. Overview
2. Configuration of Flight Vehicle Control System
2-1. Configuration of Server
2-2. Configuration of Terminal Device
2-3. Configuration of Flight Vehicle
3. Action of Information Processing Device
3-1. Overview of Functions of Information Processing Device
3-2. User Interface
4. Processing Example
4-1. Flight Path Generating Processing
4-2. Addition Processing
4-3. Insertion Processing
4-4. Deletion Processing
4-5. Synthesis Processing
4-6. Output Processing
4-7. Connection Determination Processing
4-8. Connecting Trajectory Generating Processing
4-9. Synthesis Determination Processing
4-10. Synthesized Trajectory Generating Processing
5. Modifications
6. Conclusion

1. OVERVIEW

Unmanned aerial vehicles such as drones have been actively developed. In recent years, in order to cause a flight vehicle to fly even in an area in which an operator cannot visually recognize the flight vehicle, technology developed has been carried out to enable a user to set a flight path of the flight vehicle in advance.

Generally, a user uses a two-dimensional screen to input a flight path of a flight vehicle. However, in many cases, a flight path of a flight vehicle has a three-dimensional trajectory. It takes time for a user to input a flight path in three dimensions using a two-dimensional screen since, for example, an operation of viewpoint conversion is required. It is not easy to generate a flight path of a flight vehicle.

Incidentally, it is conceivable that preset flight patterns are stored in the flight vehicle and that the user selects a flight pattern to cause the flight vehicle to perform a user's desired action. However, in this method, the motion of the flight vehicle becomes monotonous, and the degree of freedom of the user is low. There is another problem that a plurality of flight patterns cannot be continuously executed.

Therefore, in the present embodiment, the above problem is solved by the following method.

Figure 1B:
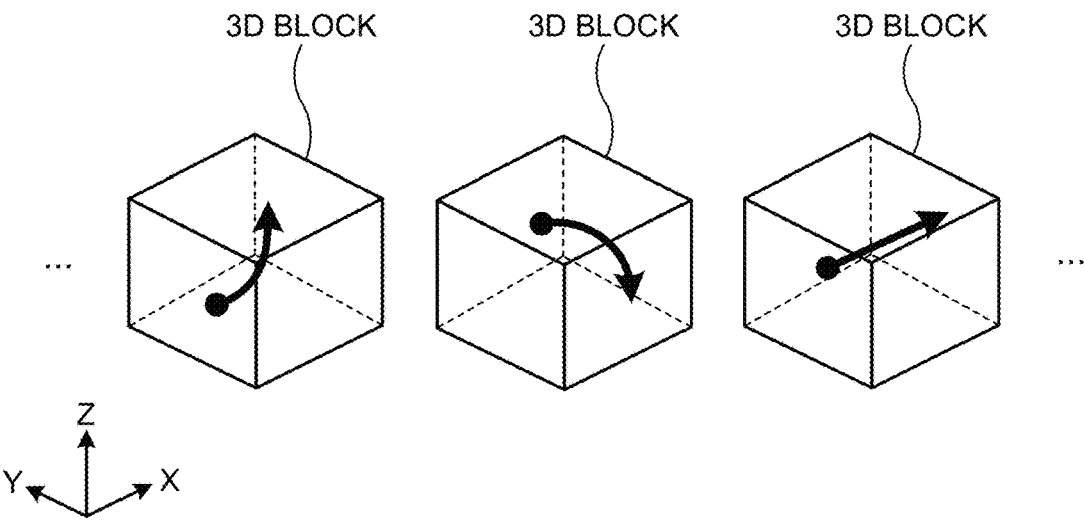
FIG. 1B is a diagram illustrating virtual 3D blocks in which a trajectory of a flight vehicle is preset.

For example, the information processing device holds in advance a plurality of virtual 3D blocks each having a preset trajectory of the flight vehicle. FIGS. 1A and 1B are diagrams illustrating virtual 3D blocks in which a trajectory of a flight vehicle is preset. In the drawings, an X axis and a Y axis indicate a horizontal direction, and a Z axis indicates a vertical direction. Illustrated in FIG. 1A are sixteen 3D blocks viewed from above (Z-axis positive direction). Illustrated in FIG. 1B are three 3D blocks viewed from obliquely above. Each of the 3D blocks illustrated in FIGS. 1A and 1B is a rectangular parallelepiped (or a cube). In these 3D blocks, for example, different trajectories, such as right turn, ascent, or travel straight, are preset. An arrow in a 3D block indicates the trajectory of the flight vehicle. In a 3D block, a special action such as takeoff, landing, or return to home (RTH) may be preset.

Figure 2A:
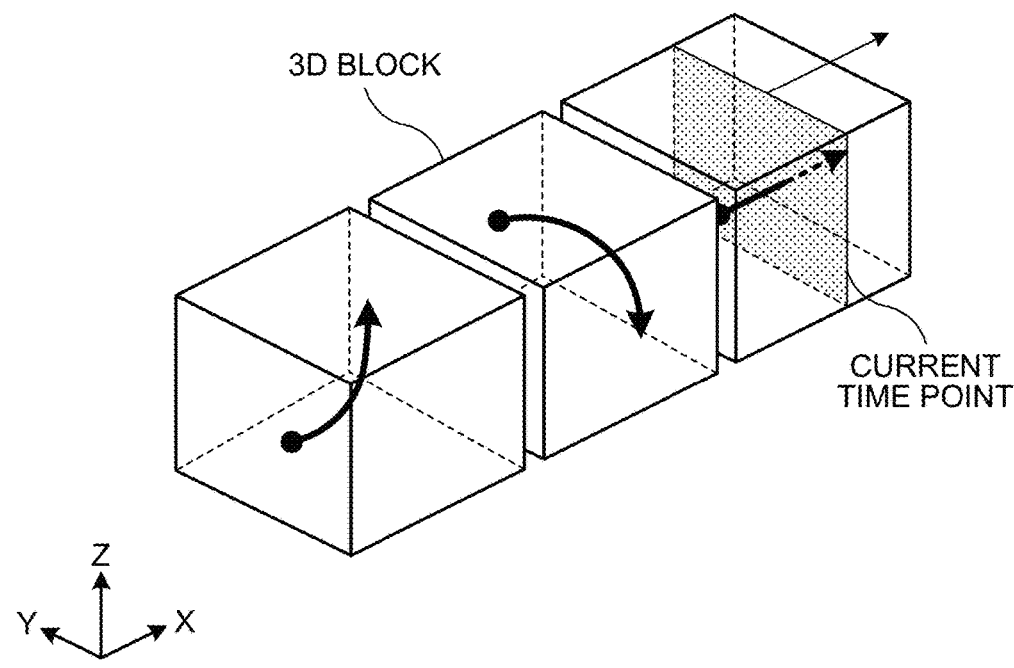
FIG. 2A is a diagram illustrating 3D blocks that are arranged.
Figure 2B:
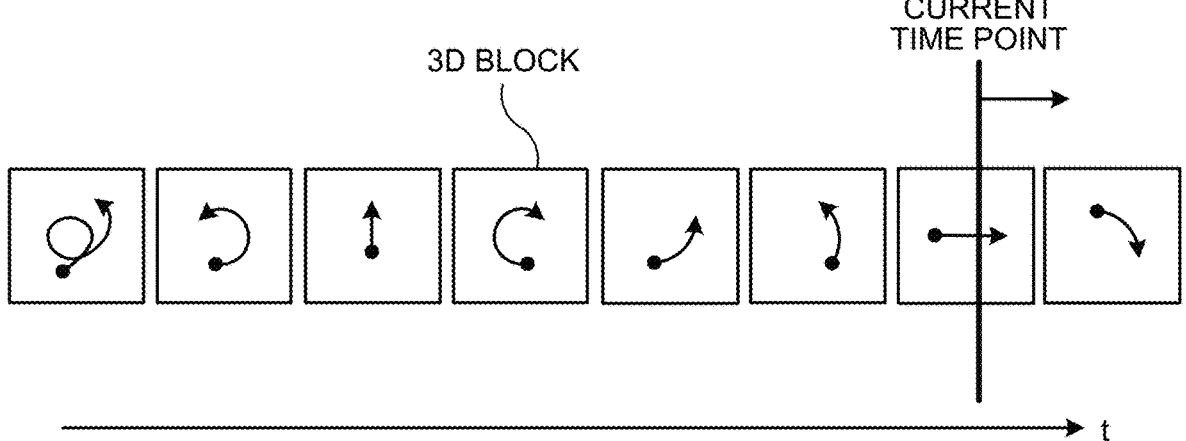
FIG. 2B is a diagram illustrating 3D blocks that are arranged.

Then, the user arranges these 3D blocks in a predetermined area in a screen using a predetermined user interface (for example, a screen of a dedicated application installed in the information processing device), thereby inputting continuous motion of the flight vehicle to the information processing device. Note that these 3D blocks may be not only moved in the screen but also enlarged, reduced, or rotated. The user arranges a plurality of 3D blocks on the screen while enlarging, reducing, rotating, or moving the 3D blocks. FIGS. 2A and 2B are diagrams illustrating 3D blocks that are arranged. Illustrated in FIG. 2A is a state in which 3D blocks are arranged in a virtual 3D space. When the 3D blocks are arranged in the virtual 3D space, the processing order may be included in each block, or a t-axis penetrating each block may be provided as a straight line or a curve on the xyz space. Furthermore, the position of the t-axis penetrating each block at each elapsed time may be displayed as a point or a cross section of each block. Illustrated in FIG. 2B is a state in which 3D blocks are arranged in time series. The information processing device generates a flight path of the flight vehicle on the basis of the user's input. The flight vehicle flies in accordance with the information of the generated flight path.

As a result, the user can easily generate the flight path of the flight vehicle. For example, the user can input the flight path of the flight vehicle with a small number of times of viewpoint conversion even on a two-dimensional screen. As a result, the user can generate the flight path of the flight vehicle with a short creation time.

Note that, in a case where a continuous motion of the flight vehicle is expressed by arranging 3D blocks, it is conceivable that the end of a trajectory of a 3D block and the start end of a trajectory of a subsequent 3D block are located at positions far from each other. In this case, it is conceivable that the generated trajectory becomes steep and that the flight vehicle cannot follow the motion. Therefore, it is necessary to smoothly connect the trajectories of the two connected 3D blocks; however, it is conceivable that it is difficult to smoothly connect the trajectories depending on a combination of the 3D blocks.

Therefore, the information processing device according to the present embodiment determines whether or not it is possible to connect two 3D blocks which the user intends to connect to each other. Moreover, the information processing device displays the determination result to the user. Note that the information processing device may execute connection determination for all combinations of 3D blocks in advance and display combinations of connectable 3D blocks to the user in response to the user's operation on the application screen. As a result, the user can generate the flight path of the flight vehicle even more easily.

Although the overview of the present embodiment has been described above, the flight vehicle control system 1 according to the present embodiment will be described in detail below. Note that the flight vehicle control system can be rephrased as an information processing system.

2. CONFIGURATION OF FLIGHT VEHICLE CONTROL SYSTEM

First, the overall configuration of the flight vehicle control system 1 will be described.

Figure 3:
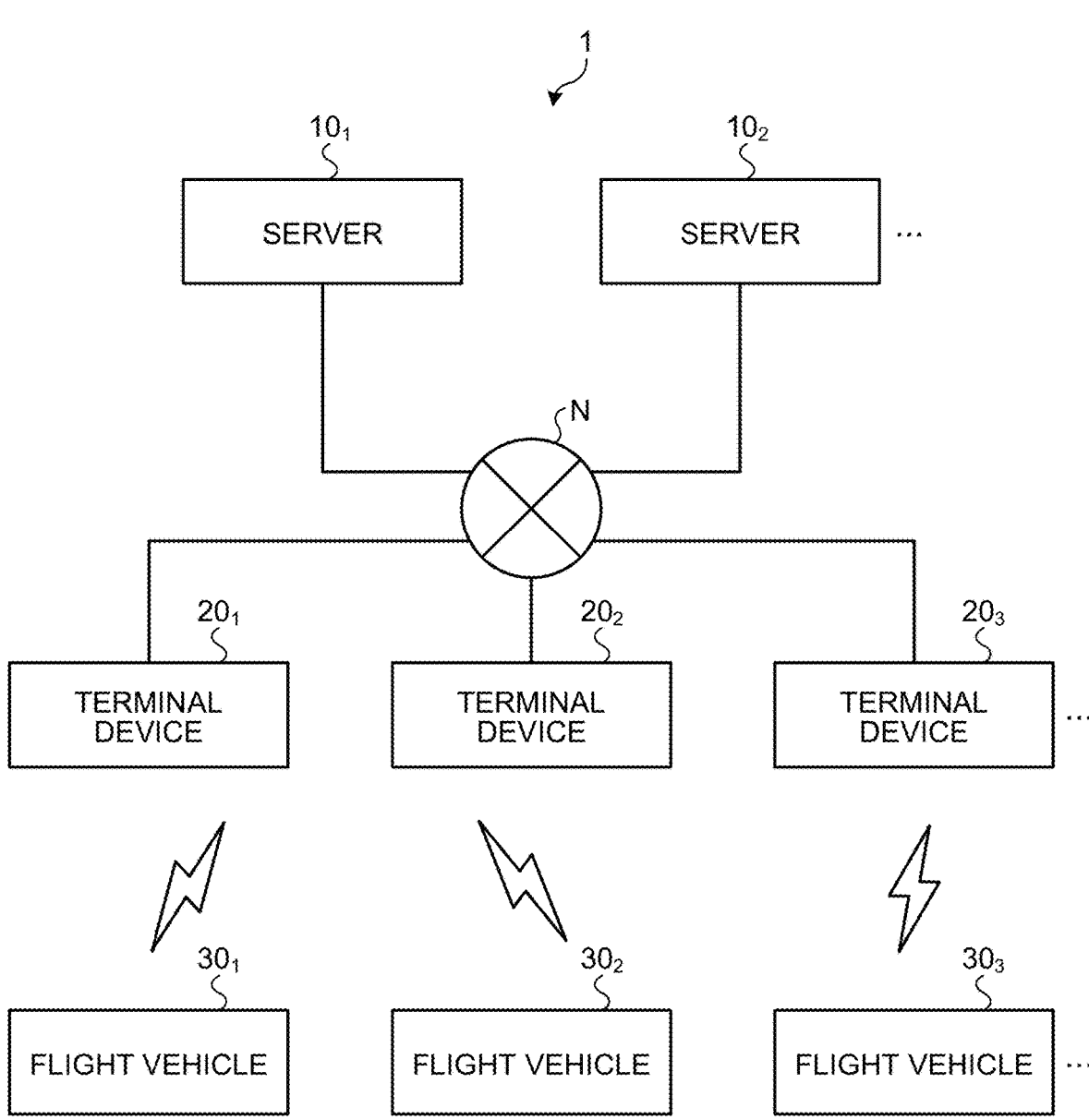
FIG. 3 is a diagram illustrating a configuration example of a flight vehicle control system according to an embodiment of the present disclosure.

FIG. 3 is a diagram illustrating a configuration example of the flight vehicle control system 1 according to an embodiment of the present disclosure. The flight vehicle control system 1 is an information processing system that performs processing related to the flight of flight vehicles 30. The flight vehicle control system 1 includes servers 10, terminal devices 20, and flight vehicles 30. Note that the devices in the drawing may be regarded as devices in a logical sense. That is, some of the devices in the drawing may be implemented by a virtual machine (VM), a container, a docker, or the like, and they may be implemented on physically the same hardware.

The servers 10 and the terminal devices 20 each have a communication function and are connected via a network N. Furthermore, the flight vehicles 30 have a wireless communication function and are connected to the respective terminal devices 20 wirelessly. The flight vehicles 30 may be configured to be connectable to the network N. The servers 10, the terminal devices 20, and the flight vehicles 30 can be rephrased as communication devices. Although only one network N is illustrated in the example of FIG. 3, there may be a plurality of networks N.

The network N is a communication network including a local area network (LAN), a wide area network (WAN), a cellular network, a house phone network, a regional Internet protocol (IP) network, the Internet, or the like. The network N may include a wired network or a wireless network. In addition, the network N may include a core network. The core network is, for example, an Evolved Packet Core (EPC) or a 5G Core network (5GC). In addition, the network N may include a data network other than the core network. The data network may be a service network of a telecommunications carrier, for example, an IP Multimedia Subsystem (IMS) network. Furthermore, the data network may be a private network such as an intra-company network.

The communication devices such as the terminal devices 20 and the flight vehicles 30 may be configured to be connected to the network N or another communication device using radio access technology (RAT) such as long term evolution (LTE), new radio (NR), Wi-Fi, or Bluetooth (registered trademark). In this case, the communication devices may be configured to be able to use different radio access technologies. For example, the communication devices may be configured to be able to use NR and Wi-Fi. Furthermore, the communication devices may be configured to be able to use different cellular communication technologies (for example, LTE and NR). LTE and NR are types of cellular communication technology, which enable mobile communication of a communication device by arranging a plurality of areas covered by a base station in the shape of cells.

Note that the communication devices such as the servers 10, the terminal devices 20, and the flight vehicles 30 may be connectable to the network N or another communication device using radio access technology other than LTE, NR, Wi-Fi, and Bluetooth. For example, the communication device may be connectable to the network N or another communication device by using low power wide area (LPWA) communication. Furthermore, the communication device may be connectable to the network N or another communication device by using wireless communication of a proprietary standard. Of course, the communication device may be connectable to the network N or another communication device by using wireless communication of another known standard.

Hereinafter, the configuration of each device included in the flight vehicle control system 1 will be specifically described. Note that the configurations of the respective devices described below are merely examples. The configuration of each of the devices may be different from the following configuration.

<2-1. Configuration of Server>

First, the configuration of a server 10 will be described.

The server 10 is an information processing device (computer) that performs processing related to flight control of a flight vehicle 30. For example, the server 10 is a computer that performs automatic flight processing of a flight vehicle 30. Any form of computer can be employed as the server 10. For example, the server 10 may be a PC server, a midrange server, or a mainframe server.

Figure 4:
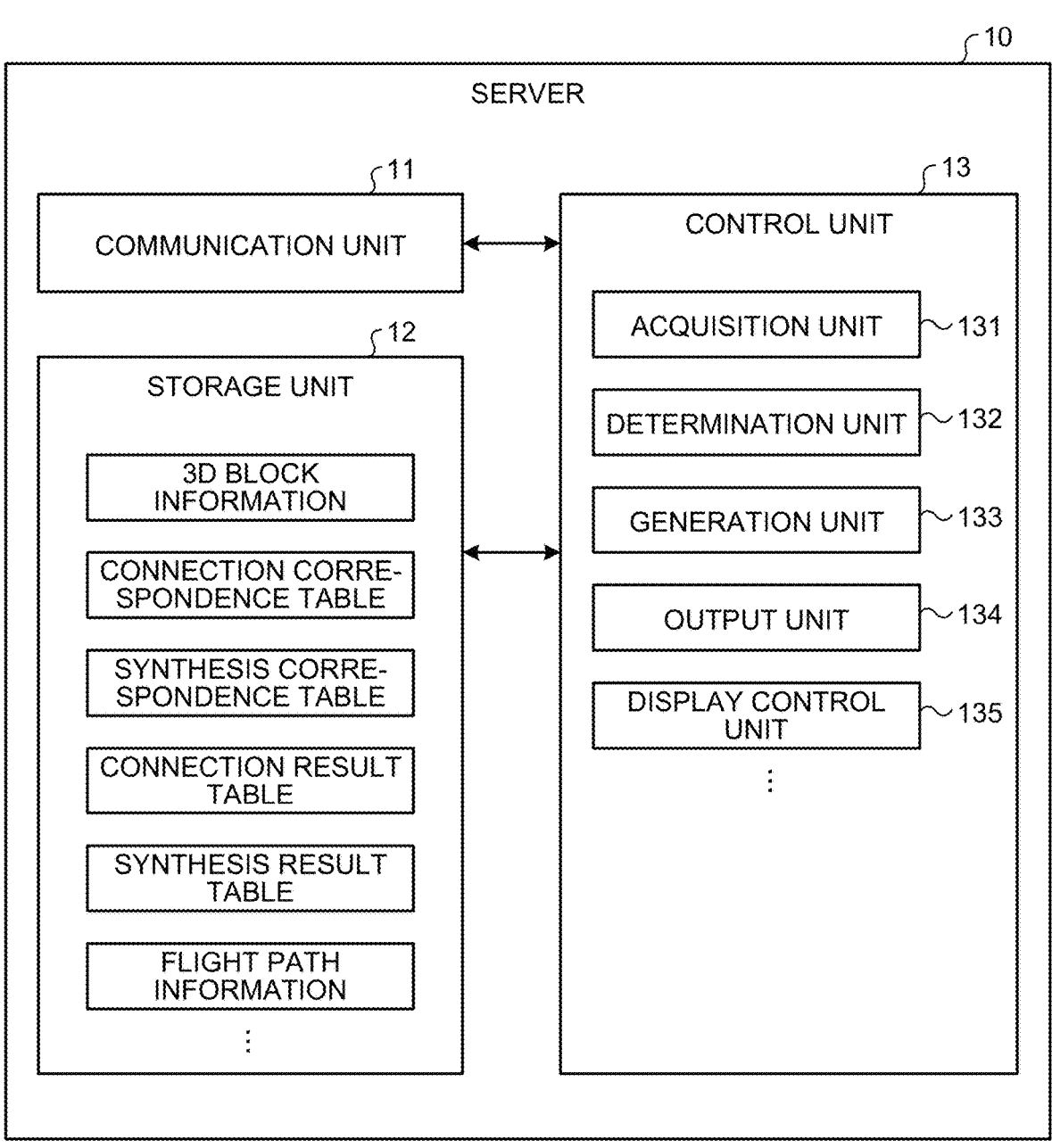
FIG. 4 is a diagram illustrating a configuration example of a server according to the embodiment of the disclosure.

FIG. 4 is a diagram illustrating a configuration example of a server 10 according to the embodiment of the disclosure. The server 10 includes a communication unit 11, a storage unit 12, and a control unit 13. Note that the configuration illustrated in FIG. 4 is a functional configuration, and the hardware configuration may be different from the functional configuration. Furthermore, the functions of the server 10 may be implemented in a distributed manner to a plurality of physically separated configurations. For example, the server 10 may include a plurality of server devices.

The communication unit 11 is a communication interface for communicating with other devices. For example, the communication unit 11 is a local area network (LAN) interface such as a network interface card (NIC). The communication unit 11 may be a wired interface or a wireless interface. The communication unit 11 communicates with a terminal device 20, a flight vehicle 30, and others under the control of the control unit 13.

The storage unit 12 is a storage device capable of reading and writing data, such as a dynamic random access memory (DRAM), a static random access memory (SRAM), a flash memory, or a hard disk. The storage unit 12 functions as a storage means of the server 10. The storage unit 12 stores, for example, various types of information such as 3D block information, a connection correspondence table, a synthesis correspondence table, a connection result table, a synthesis result table, and flight path information.

The control unit 13 is a controller that controls each unit of the server 10. The control unit 13 is implemented by, for example, a processor such as a central processing unit (CPU), a micro processing unit (MPU), or a graphics processing unit (GPU). For example, the control unit 13 is implemented by a processor executing various programs stored in a storage device inside the server 10 using a random access memory (RAM) or the like as a work area. Note that the control unit 13 may be implemented by an integrated circuit such as an application specific integrated circuit (ASIC) or a field programmable gate array (FPGA). Any of the CPU, the MPU, the GPU, the ASIC, and the FPGA can be regarded as a controller.

The control unit 13 includes an acquisition unit 131, a determination unit 132, a generation unit 133, an output unit 134, and a display control unit 135. Each of the blocks (acquisition unit 131 to display control unit 135) included in the control unit 13 is a functional block indicating a function of the control unit 13. These functional blocks may be software blocks or hardware blocks. For example, each of the functional blocks described above may be one software module implemented by software (including microprograms) or may be one circuit block on a semiconductor chip (die). It is naturally understood that each of the functional blocks may be one processor or one integrated circuit. The control unit 13 may include functional units different from the above-described functional blocks. The functional blocks may be configured in any manner.

Note that the control unit 13 may include functional units different from the above-described functional blocks. In addition, some or all of the actions of the blocks (acquisition unit 131 to display control unit 135) included in the control unit 13 may be performed by another device. For example, some or all of the actions of the blocks included in the control unit 13 may be performed by one or a plurality of control units selected from among control units 23 of terminal devices 20 and control units 33 of flight vehicles 30. The action of each of the blocks included in the control unit 13 will be described later.

<2-2. Configuration of Terminal Device>

Next, the configuration of a terminal device 20 will be described.

The terminal device 20 is a communication device that communicates with a server 10 and a flight vehicle 30. For example, the terminal device 20 is a terminal carried by a user who operates a flight vehicle 30. The terminal device 20 transmits, to the flight vehicle 30, for example, control information for the user to control the flight vehicle 30. Furthermore, the terminal device 20 receives, for example, the current state of the flight vehicle 30 (for example, information of the position or the attitude of the flight vehicle 30) from the flight vehicle 30. The terminal device 20 may be configured to exchange information (for example, information for automatic flight control of the flight vehicle 30 or estimation information of the position and the attitude of the flight vehicle 30) for controlling the flight vehicle 30 with a server 10.

The terminal device 20 is, for example, a proportional controller used by the user to operate the flight vehicle 30. The terminal device 20 is not limited to the proportional controller and may be, for example, a mobile phone, a smart device (smartphone or tablet), a personal digital assistant (PDA), or a personal computer. The terminal device 20 is not limited to a smart device or a personal computer and may be a controller with a display or a joystick with a display.

Furthermore, the terminal device 20 may be an imaging device (for example, a camcorder) having a communication function or may be a traveling object (for example, a motorcycle or a moving relay vehicle) on which a communication device such as a field pickup unit (FPU) is mounted. Alternatively, the terminal device 20 may be a machine to machine (M2M) device or an Internet of things (IoT) device. Alternatively, the terminal device 20 may be a router. Furthermore, the terminal device 20 may be an xR device such as an augmented reality (AR) device, a virtual reality (VR) device, or a mixed reality (MR) device. Furthermore, the terminal device 20 may be a wearable device such as a smart watch.

Figure 5:
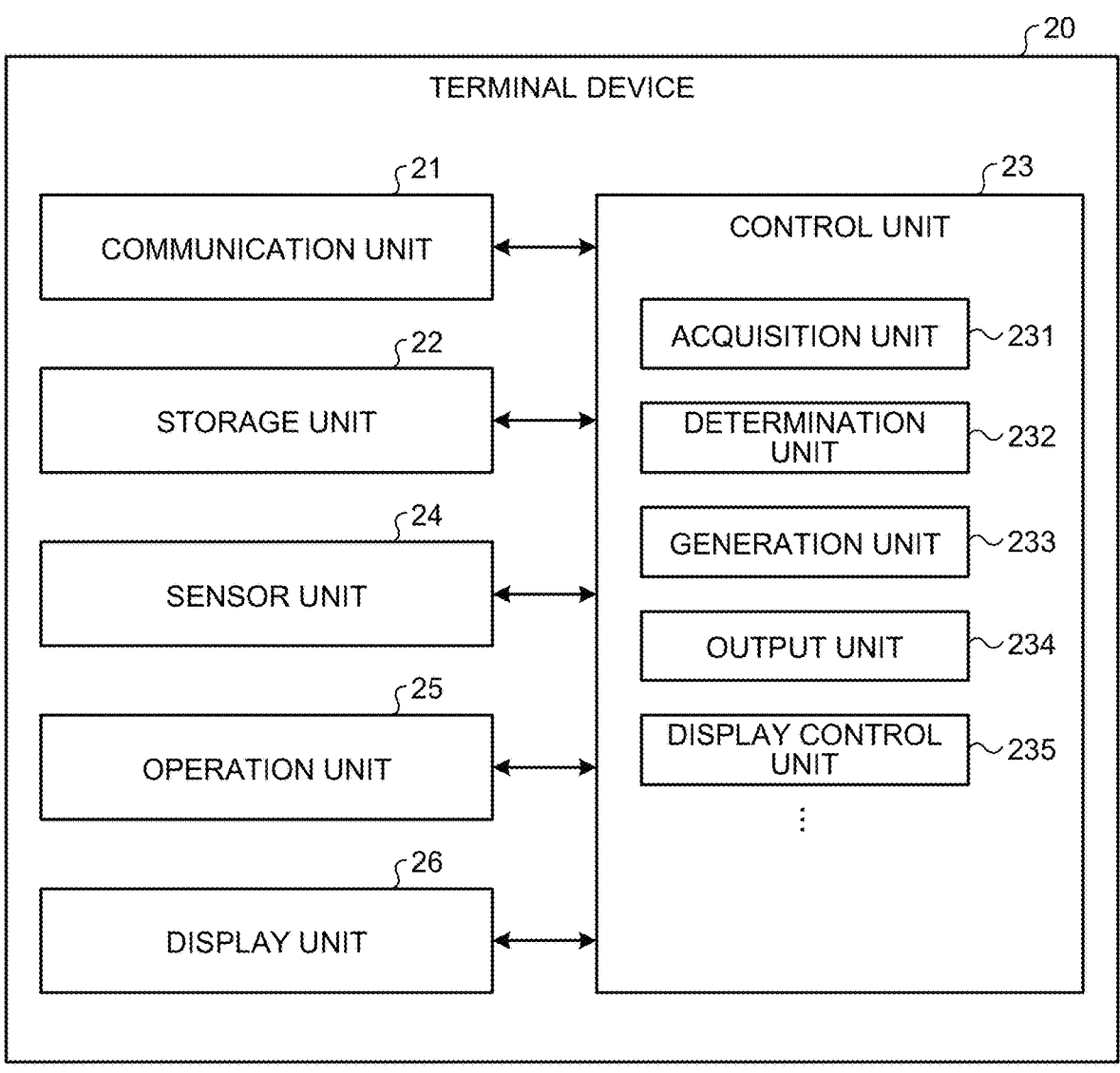
FIG. 5 is a diagram illustrating a configuration example of a terminal device according to the embodiment of the disclosure.

FIG. 5 is a diagram illustrating a configuration example of a terminal device 20 according to the embodiment of the disclosure. The terminal device 20 includes a communication unit 21, a storage unit 22, a control unit 23, a sensor unit 24, an operation unit 25, and a display unit 26. Note that the configuration illustrated in FIG. 5 is a functional configuration, and the hardware configuration may be different from the functional configuration. Furthermore, the functions of the terminal device 20 may be implemented in a distributed manner to a plurality of physically separated configurations.

The communication unit 21 is a communication interface for communicating with other devices. The communication unit 21 is, for example, a LAN interface such as an NIC. The communication unit 21 may be a wired interface or a wireless interface. The communication unit 21 communicates with a server 10, a flight vehicle 30, and others under the control of the control unit 23.

The storage unit 22 is a storage device capable of reading and writing data, such as a DRAM, an SRAM, a flash memory, or a hard disk. The storage unit 22 functions as a storage means of the terminal device 20. The storage unit 22 stores, for example, a feature point map.

The control unit 23 is a controller that controls each of the units of the terminal device 20. The control unit 23 is implemented by, for example, a processor such as a CPU, an MPU, or a GPU. For example, the control unit 23 is implemented by the processor executing various programs stored in the storage device inside the terminal device 20 using a RAM or the like as a work area. Note that the control unit 23 may be implemented by an integrated circuit such as an ASIC or an FPGA. Any of the CPU, the MPU, the GPU, the ASIC, and the FPGA can be regarded as a controller.

The control unit 23 includes an acquisition unit 231, a determination unit 232, a generation unit 233, an output unit 234, and a display control unit 235. Each of the blocks (acquisition unit 231 to display control unit 235) included in the control unit 23 is a functional block indicating a function of the control unit 23. These functional blocks may be software blocks or hardware blocks. For example, each of the functional blocks described above may be one software module implemented by software (including microprograms) or may be one circuit block on a semiconductor chip (die). It is naturally understood that each of the functional blocks may be one processor or one integrated circuit. The control unit 23 may include functional units different from the above-described functional blocks. The functional blocks may be configured in any manner.

Note that the control unit 23 may include functional units different from the above-described functional blocks. In addition, some or all of the actions of the blocks (acquisition unit 231 to display control unit 235) included in the control unit 23 may be performed by another device. For example, some or all of the actions of the blocks included in the control unit 23 may be performed by one or a plurality of control units selected from a group of control units 13 of servers 10 and control units 33 of flight vehicles 30.

The sensor unit 24 is a sensor that acquires information regarding the position or the attitude of the terminal device 20. For example, the sensor unit 24 is a global navigation satellite system (GNSS) sensor. Here, the GNSS sensor may be a global positioning system (GPS) sensor, a GLONASS sensor, a Galileo sensor, or a quasi-zenith satellite system (QZSS) sensor. The GNSS sensor can be rephrased as a GNSS reception module. Note that the sensor unit 24 is not limited to the GNSS sensor and may be, for example, an acceleration sensor. Furthermore, the sensor unit 24 may be a combination of a plurality of sensors.

The operation unit 25 is an operation device for a user to perform various operations. For example, the operation unit 25 includes a lever, a button, a keyboard, a mouse, an operation key, and the like. Note that, in a case where a touch panel is adopted in the terminal device 20, the touch panel is also included in the operation unit 25. In this case, the user performs various operations by touching the screen with a finger or a stylus.

The display unit 26 is a display device for displaying various types of information. The display device is, for example, a liquid crystal display or an organic EL display. Note that the display unit 26 may be a display device of a touch panel type. In this case, the display unit 26 also functions as an input unit (for example, the operation unit 25).

<2-3. Configuration of Flight Vehicle>

Next, the configuration of a flight vehicle 30 will be described.

The flight vehicle 30 is configured to enable a user to manually operate the flight vehicle 30 from a remote place by using a terminal device 20. The flight vehicle 30 may be configured to automatically fly. For example, the flight vehicle 30 may be configured to automatically fly along a flight path generated by the user.

The flight vehicle 30 is typically a drone but may not necessarily be a drone. For example, the flight vehicle 30 may be a traveling vehicle that travels in the atmosphere other than the drone. For example, the flight vehicle 30 may be an aircraft such as an airplane, an airship, or a helicopter. Note that the concept of the aircraft includes not only aerodynes such as airplanes and the gliders but also aerostats such as balloons and airships. In addition, the concept of the aircraft includes not only the aerodynes and the aerostats but also rotorcraft such as helicopters and autogyros.

Note that the flight vehicle 30 may be a manned aircraft or an unmanned aircraft. Note that the concept of the unmanned aircraft also includes unmanned aircraft systems (UASs) and tethered UASs. The concept of the unmanned aircraft also includes Lighter-than-Air UASs (LTAs) and Heavier-than-Air UASs (HTAs). Other than the above, the concept of the unmanned aircraft also includes High Altitude UAS Platforms (HAPs). The drones are one type of the unmanned aircraft.

Furthermore, the flight vehicle 30 may be a traveling vehicle that travels outside the atmosphere. For example, the flight vehicle 30 may be an artificial celestial body such as an artificial satellite, a spacecraft, a space station, or a probe.

Figure 6:
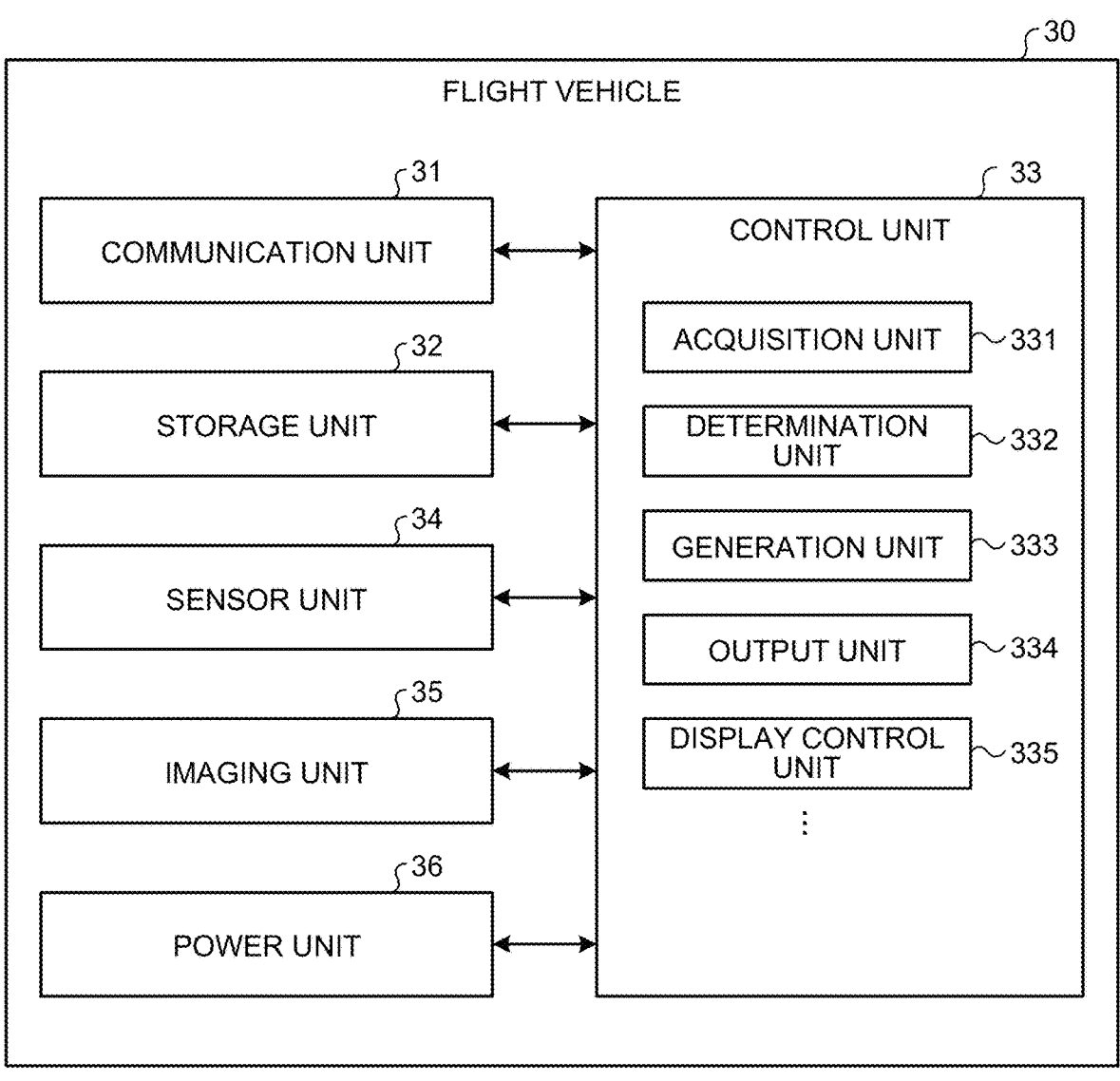
FIG. 6 is a diagram illustrating a configuration example of a flight vehicle according to the embodiment of the disclosure.

FIG. 6 is a diagram illustrating a configuration example of a flight vehicle 30 according to the embodiment of the disclosure. The flight vehicle 30 includes a communication unit 31, a storage unit 32, a control unit 33, a sensor unit 34, an imaging unit 35, and a power unit 36. Note that the configuration illustrated in FIG. 6 is a functional configuration, and the hardware configuration may be different from the functional configuration. Furthermore, the functions of the flight vehicle 30 may be implemented in a distributed manner to a plurality of physically separated configurations.

The communication unit 31 is a communication interface for communicating with other devices. The communication unit 31 is, for example, a LAN interface such as an NIC. Note that the communication unit 31 may be a wired interface or a wireless interface. The communication unit 31 communicates with a server 10, a terminal device 20, a flight vehicle 30, or others under the control of the control unit 33.

The storage unit 32 is a storage device capable of reading and writing data, such as a DRAM, an SRAM, a flash memory, or a hard disk. The storage unit 32 functions as a storage means of the flight vehicle 30. The storage unit 32 stores, for example, a feature point map.

The control unit 33 is a controller that controls each of the units of the flight vehicle 30. The control unit 33 is implemented by, for example, a processor such as a CPU, an MPU, or a GPU. For example, the control unit 33 is implemented by the processor executing various programs stored in the storage device inside the flight vehicle 30 using a RAM or the like as a work area. Note that the control unit 33 may be implemented by an integrated circuit such as an ASIC or an FPGA. Any of the CPU, the MPU, the GPU, the ASIC, and the FPGA can be regarded as a controller.

The control unit 33 includes an acquisition unit 331, a determination unit 332, a generation unit 333, an output unit 334, and a display control unit 335. Each of the blocks (acquisition unit 331 to display control unit 335) included in the control unit 33 is a functional block indicating a function of the control unit 33. These functional blocks may be software blocks or hardware blocks. For example, each of the functional blocks described above may be one software module implemented by software (including micropro-grams) or may be one circuit block on a semiconductor chip (die). It is naturally understood that each of the functional blocks may be one processor or one integrated circuit. The control unit 33 may include functional units different from the above-described functional blocks. The functional blocks may be configured in any manner.

Note that the control unit 33 may include functional units different from the above-described functional blocks. In addition, some or all of the actions of the blocks (acquisition unit 331 to display control unit 335) included in the control unit 33 may be performed by another device. For example, some or all of the actions of the blocks included in the control unit 33 may be performed by one or a plurality of control units selected from a group of control units 13 of servers 10 and control units 23 of terminal devices 20.

The imaging unit 35 is a conversion unit that converts an optical image into an electric signal. The imaging unit 35 includes, for example, an image sensor, a signal processing circuit that processes an analog pixel signal output from the image sensor, and others and converts light entering from a lens into digital data (image data). Note that an image captured by the imaging unit 35 is not limited to a video (moving image) and may be a still image. Note that the imaging unit 35 may be a camera. In this care, the imaging unit 35 can be referred to as a first person view (FPV) camera.

The sensor unit 34 is a sensor that acquires information regarding the position or the attitude of the flight vehicle 30. For example, the sensor unit 34 is a GNSS sensor. Here, the GNSS sensor may be a GPS sensor, a GLONASS sensor, a Galileo sensor, or a QZSS sensor. The GNSS sensor can be rephrased as a GNSS reception module. Note that the sensor unit 34 is not limited to the GNSS sensor and may be, for example, an acceleration sensor. In addition, the sensor unit 34 may be an inertial measurement unit (IMU), a barometer, a geomagnetic sensor, or an altimeter. Furthermore, the sensor unit 34 may be a combination of a plurality of sensors.

Furthermore, the sensor unit 34 may be a sensor for generating 3D map information. More specifically, the sensor unit 34 may be a sensor that reads a three-dimensional structure of the surrounding environment. For example, the sensor unit 34 may be a depth sensor such as light detection and ranging (LiDAR). Of course, the sensor unit 24 may be a depth sensor other than the LiDAR. Alternatively, the sensor unit 34 may be a distance measuring system using a millimeter wave radar. In addition, the sensor unit 34 may be a time of flight (ToF) sensor or a stereo camera.

The power unit 36 is the power that enables the flight vehicle 30 to fly. For example, the power unit 36 is a motor that drives various mechanisms included in the flight vehicle 30.

3. ACTION OF INFORMATION PROCESSING DEVICE

The configuration of the flight vehicle control system 1 has been described above. Next, the action of the information processing device will be described.

<3-1. Overview of Functions of Information Processing Device>

First, an overview of functions of an information processing device will be described. The actions of the information processing device described below may be executed by any one of a plurality of devices (servers 10, terminal devices 20, and flight vehicles 30) included in the flight vehicle control system 1 or may be executed, in cooperation, by control units (information processing devices) of a plurality of devices included in the flight vehicle control system 1. The following description will be given on the premise that the control unit of the information processing device executes the actions.

Figure 7:
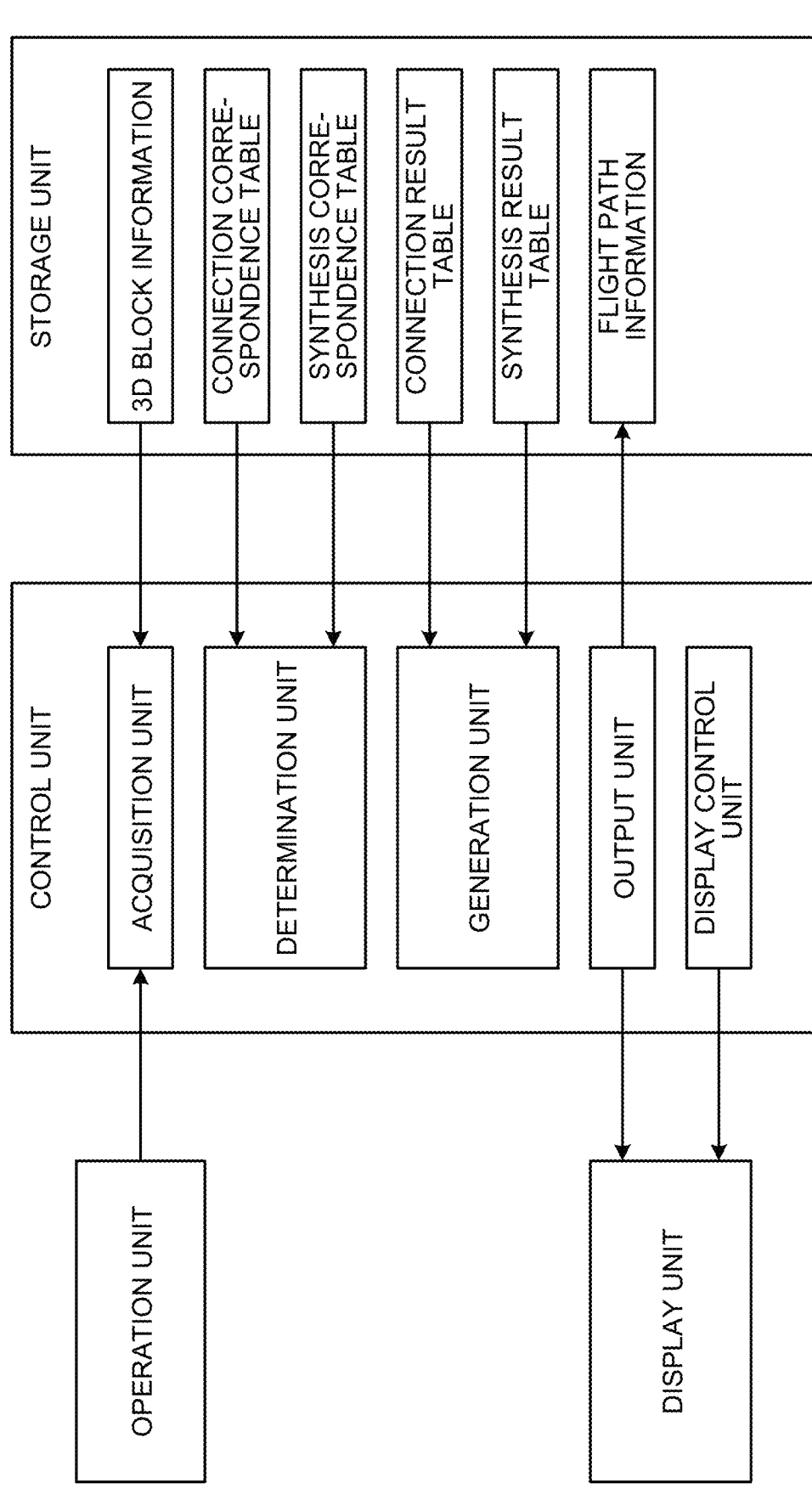
FIG. 7 is a functional block diagram for explaining functions of an information processing device.

The information processing device generates and outputs information of a flight path of a flight vehicle 30 in accordance with a user's operation. FIG. 7 is a functional block diagram for explaining functions of an information processing device. The functions of the information processing device according to the present embodiment are classified into the following (1) to (5). Generation and output of flight path information are implemented by action of the functional blocks illustrated in the following (1) to (5) in cooperation with each other.

(1) Acquisition Unit
(2) Determination Unit
(3) Generation Unit
(4) Output Unit
(5) Display Control Unit Here, the acquisition unit may be an acquisition unit 131 of a server 10, an acquisition unit 231 of a terminal device 20, or an acquisition unit 331 of a flight vehicle 30. Furthermore, the determination unit may be a determination unit 132 of a server 10, a determination unit 232 of a terminal device 20, or a determination unit 332 of a flight vehicle 30. The generation unit may be a generation unit 133 of a server 10, a generation unit 233 of a terminal device 20, or a generation unit 333 of a flight vehicle 30. The output unit may be an output unit 134 of a server 10, an output unit 234 of a terminal device 20, or an output unit 334 of a flight vehicle 30. The display control unit may be a display control unit 135 of a server 10, a display control unit 235 of a terminal device 20, or a display control unit 335 of a flight vehicle 30.

Furthermore, the information processing device includes a storage unit that stores various types of information for the control unit to generate information of a flight path of a flight vehicle 30. The storage unit may be a storage unit 12 of a server 10, a storage unit 22 of a terminal device 20, or a storage unit 22 of a flight vehicle 30. The storage unit stores various types of information such as 3D block information, a connection correspondence table, a synthesis correspondence table, a connection result table, a synthesis result table, and flight path information.

Each of (1) to (5) will be described below.

(1) Acquisition Unit

The acquisition unit acquires operation information input by a user by operating an operation unit (for example, the operation unit 25 of the terminal device 20). The operation information is information of the user's operation on one or a plurality of 3D blocks selected from among a plurality of virtual 3D blocks in which a trajectory of a flight vehicle is preset. For example, the operation information includes operations such as moving, enlarging, reducing, rotating, or synthesizing of 3D blocks.

The acquisition unit acquires, from the storage unit, 3D block information of each of 3D blocks used for generation of the flight path. The 3D block information is trajectory information preset in the 3D blocks. The trajectory information is, for example, information of reference coordinates, a trajectory shape, a start position attitude velocity, and an end position attitude velocity. The 3D block information may include information of an icon assigned to the 3D block.

(2) Determination Unit

The determination unit determines whether or not connection processing of two or more 3D blocks can be performed. For example, the determination unit determines whether or not two 3D blocks selected from among a plurality of virtual 3D blocks are connectable. Furthermore, the determination unit determines whether or not it is necessary for the flight vehicle 30 to pause between the two 3D blocks in order to connect the two 3D blocks. The determination unit also determines whether or not deformation processing of at least one of the two 3D blocks is required to connect the two 3D blocks. Furthermore, the determination unit determines a combination of connectable 3D blocks from among the plurality of virtual 3D blocks.

The determination unit may perform these determinations by calculation based on the 3D block information or by referring to information stored in advance in the storage unit (for example, the connection correspondence table). The connection correspondence table indicates connection forms between 3D blocks. For example, the connection correspondence table indicates the following information for all combinations of the 3D blocks.

Connectable without deformation and without stopping
Connectable without stopping if with deformation
Connectable if with stopping
Not connectable (or meaningless)

The determination unit performs the above determinations by referring to information of the corresponding part in the connection correspondence table.

Furthermore, the determination unit makes a determination regarding whether or not synthesis processing of two or more 3D blocks is possible. For example, the determination step determines whether or not two 3D blocks selected from among the plurality of virtual 3D blocks are synthesizable. The determination unit also determines a combination of 3D blocks that are synthesizable from among the plurality of virtual 3D blocks.

The determination unit may perform these determinations by calculation based on the 3D block information or by referring to information stored in advance in the storage unit (for example, the synthesis correspondence table). The synthesis correspondence table indicates synthesis forms of 3D blocks. For example, in the synthesis correspondence table, the following information is indicated for all combinations of the 3D blocks.

Synthesizable

Not synthesizable (or meaningless)

The determination unit performs the above determinations by referring to information of the corresponding part in the synthesis correspondence table.

(3) Generation Unit

The generation unit executes connection processing of a plurality of 3D blocks on the basis of the operation information acquired by the acquisition unit. For example, the generation unit executes connection processing of two 3D blocks specified on the basis of the operation information. The generation unit may perform the processing by calculation based on the 3D block information or by referring to information stored in advance in the storage unit (for example, the connection result table). The connection result table indicates connection results between the 3D blocks. For example, the connection correspondence table indicates trajectory information indicating a result of connecting two 3D blocks for all the combinations of the 3D blocks. The generation unit connects two 3D blocks by referring to information of the corresponding part in the connection result table.

The generation unit executes synthesis processing of a plurality of 3D blocks on the basis of the operation information acquired by the acquisition unit. For example, the generation unit executes synthesis processing of two 3D blocks specified on the basis of the operation information. The generation unit may perform the processing by calculation based on the 3D block information or by referring to information stored in advance in the storage unit (for example, the synthesis result table). The synthesis result table indicates synthesis results between the 3D blocks. For example, the connection correspondence table indicates trajectory information indicating a result of synthesizing two 3D blocks for all the combinations of the 3D blocks. The generation unit synthesizes two 3D blocks by referring to information of the corresponding part in the connection result table.

(4) Output Unit

The output unit outputs information of the flight path of the flight vehicle generated on the basis of the result of the processing by the generation unit. The output unit may output the information of the flight path to the storage unit or to a display device. For example, the output unit may display a plurality of connected or synthesized 3D blocks in a virtual 3D space corresponding to the real space. Furthermore, the output unit may display the plurality of connected or synthesized 3D blocks in time series.

(5) Display Control Unit

The display control unit displays the determination results of the determination unit. For example, the display control unit displays a user interface for the user to execute an operation on one or a plurality of 3D blocks and displays a determination result on the user interface.

Specifically, the display control unit displays a determination result as to whether or not the two 3D blocks are connectable. For example, the display control unit displays information of combinations of connectable 3D blocks as the determination result. The display control unit displays a determination result as to whether the action of pausing is required. The display control unit displays, as the determination result, information of combinations of 3D blocks that are connectable without requiring the action of pausing. The display control unit displays a determination result as to whether or not deformation processing is required. The display control unit displays, as the determination result, information of a combination of 3D blocks that are connectable without deformation.

Furthermore, the display control unit displays a determination result as to whether or not two 3D blocks are synthesizable. For example, the display control unit displays information of combinations of synthesizable 3D blocks as the determination result.

<3-2. User Interface>

Next, an example of a user interface for the user to input operation information will be described.

<3-2-1. Screen Example>

There are roughly three systems as the user interface (hereinafter, also referred to as a UI).

(Pattern 1)

Figure 8:
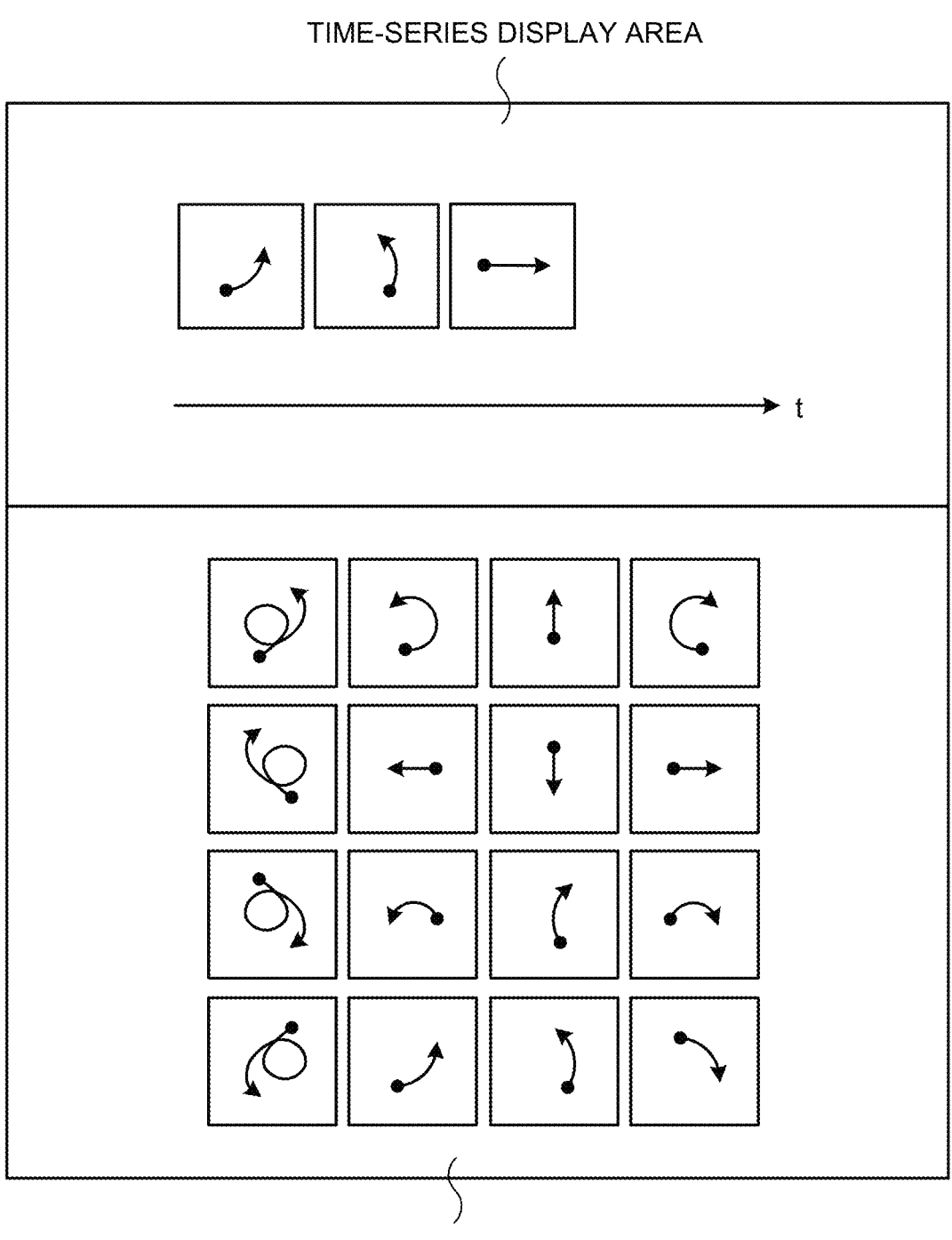
FIG. 8 is a diagram illustrating a user interface of Pattern 1.

The first one is a UI (Pattern 1) in which 3D blocks are arranged in time series. FIG. 8 is a diagram illustrating the user interface of Pattern 1. In the UI of Pattern 1, a plurality of connected or synthesized 3D blocks is displayed in time series. The UI of Pattern 1 has a time-series display area and a list display area, for example, as illustrated in FIG. 8. In the time-series display area, a plurality of 3D blocks selected and arranged by the user is displayed along time t. In the list display area, a list of a plurality of 3D blocks prepared in advance is displayed. Note that, in the list display area, a plurality of 3D blocks may be displayed page by page or hierarchized. In addition, a plurality of 3D blocks displayed in the list display area may be displayed in such a manner that connectable or synthesizable forms can be distinguished. Furthermore, in the list display area, 3D blocks that are connectable and/or synthesizable may be displayed in such a manner as to be proposed and highlighted. The user selects 3D blocks from the list display area and arranges the 3D blocks in the time-series display area. The user drags and drops a 3D block displayed in the list display area to the time-series display area.

(Pattern 2)

Figure 9:
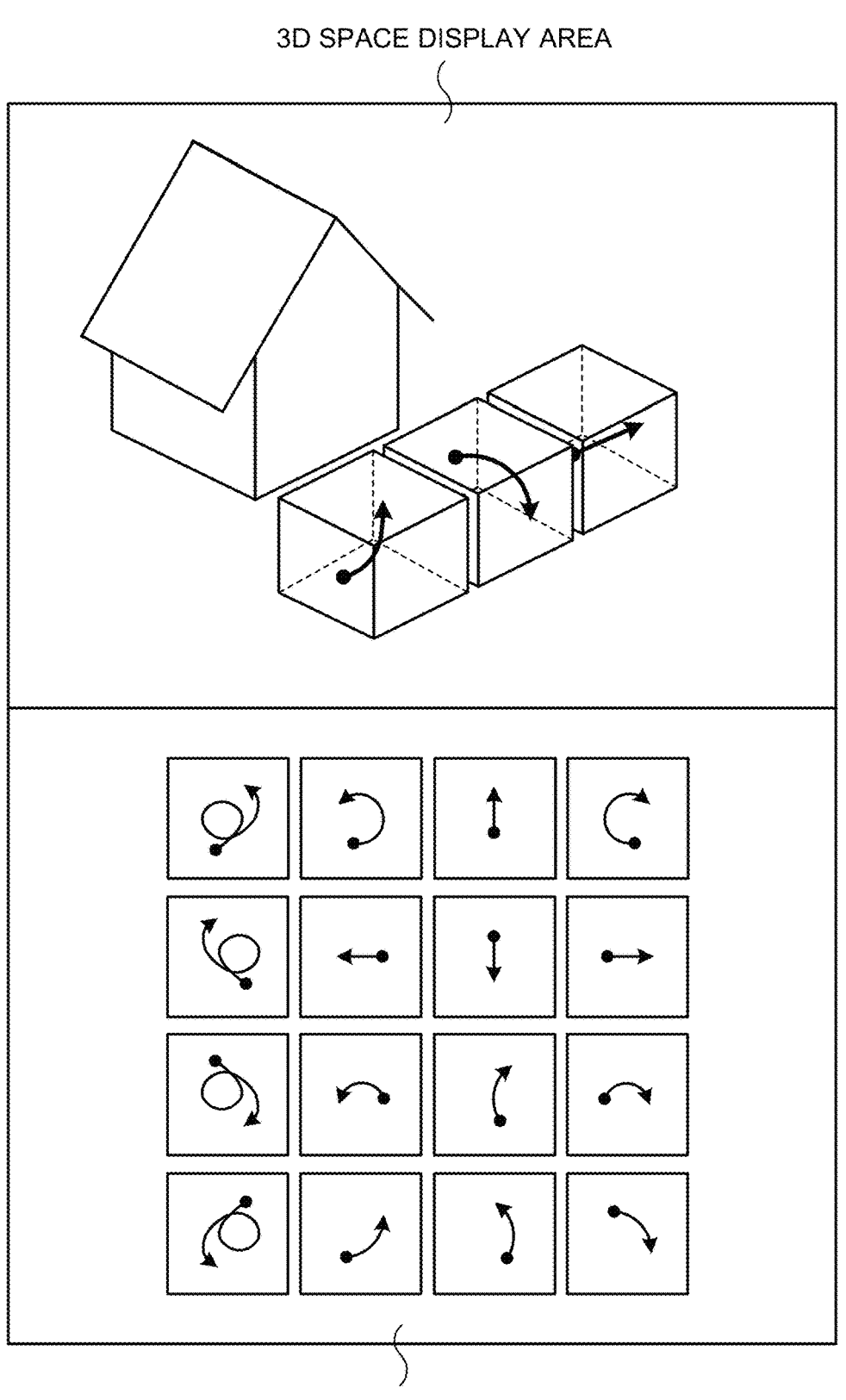
FIG. 9 is a diagram illustrating a user interface of Pattern 2.

The second one is a UI (Pattern 2) in which 3D blocks are arranged in a 3D space. FIG. 9 is a diagram illustrating the user interface of Pattern 2. In the UI of Pattern 2, a plurality of connected or synthesized 3D blocks is displayed in a virtual 3D space corresponding to the real space. The UI of Pattern 2 has a 3D space display area and a list display area, for example, as illustrated in FIG. 9. In the 3D space display area, a 3D space such as a 3D map is displayed. In the 3D space display area, 3D blocks selected by the user from the list display area can be arranged. In the list display area, a list of a plurality of 3D blocks prepared in advance is displayed. The list display area is similar to the list display area of Pattern 1. The user drags and drops a 3D block displayed in the list display area to the 3D space display area.

(Pattern 3)

Figure 10:
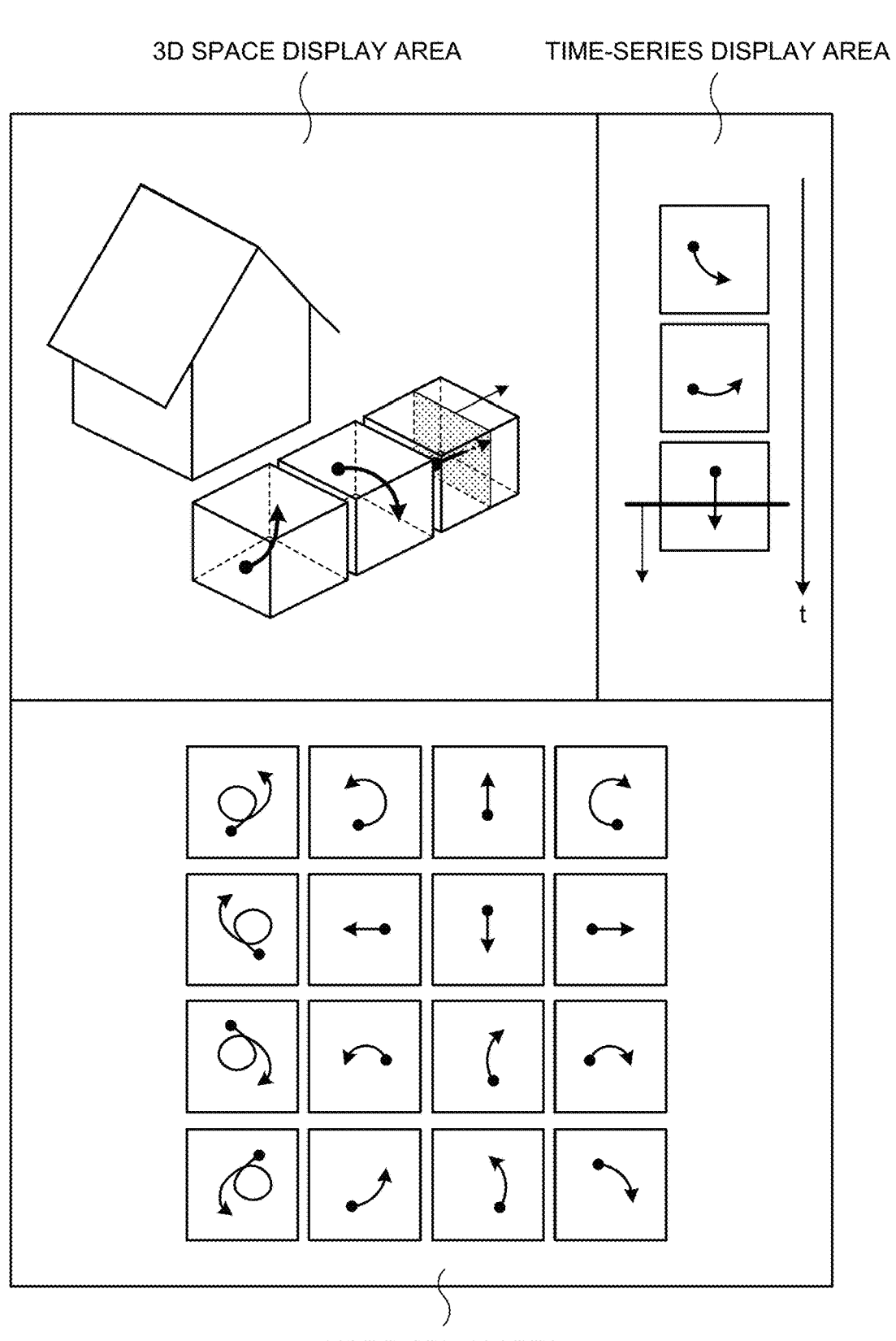
FIG. 10 is a diagram illustrating a user interface of Pattern 3.

The third one is a UI (Pattern 3) in which the UI of Pattern 1 and the UI of Pattern 2 cooperate with each other. FIG. 10 is a diagram illustrating the user interface of Pattern 3. In the UI of Pattern 3, a plurality of connected or synthesized 3D blocks is displayed in time series and is also displayed in a virtual 3D space. The UI of Pattern 3 includes a time-series display area, a 3D space display area, and a list display area, for example, as illustrated in FIG. 10. The time-series display area, the 3D space display area, and the list display area are similar to the time-series display area, the 3D space display area, and the list display areas of Pattern 1 and Pattern 2. When the user arranges 3D blocks selected from the list display area in the 3D space display area or the time-series display area, the 3D blocks are arranged in the other display area (the time-series display area or the 3D space display area) in conjunction with the arrangement. In the example of FIG. 10, the current time point (or the current position of the flight vehicle 30) is displayed in the time-series display area or the 3D space display area.

<3-2-2. Operation Example>

Next, an operation example of the user will be described.

The user can perform, for example, the following operations (1) to (5) on 3D blocks.

(1) Enlarge and Reduce (2) Rotate (3) Move (4) Synthesize (5) Connect

Each of (1) to (5) will be described below.

(1) Enlarge and Reduce

Figure 11:
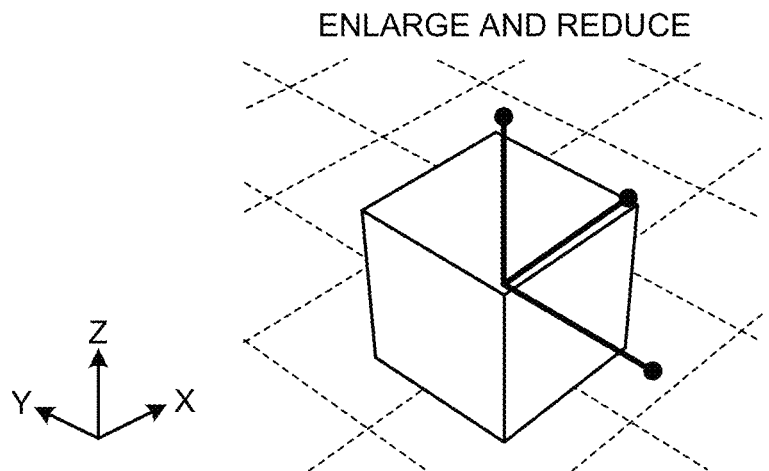
FIG. 11 is a diagram for explaining an operation of enlarging and reducing a 3D block.

The user can enlarge and reduce a 3D block. FIG. 11 is a diagram for explaining an operation of enlarging and reducing a 3D block. At this point, the information processing device may limit operations that the user can perform to enlargement and reduction in three directions (X-axis direction, Y-axis direction, and Z-axis direction). By limiting the degree of freedom of operation of the user, it becomes easy to perform 3D operation without performing a viewpoint operation on the two-dimensional screen, thereby making it possible to reduce the time for creating a trajectory.

(2) Rotate

Figure 12:
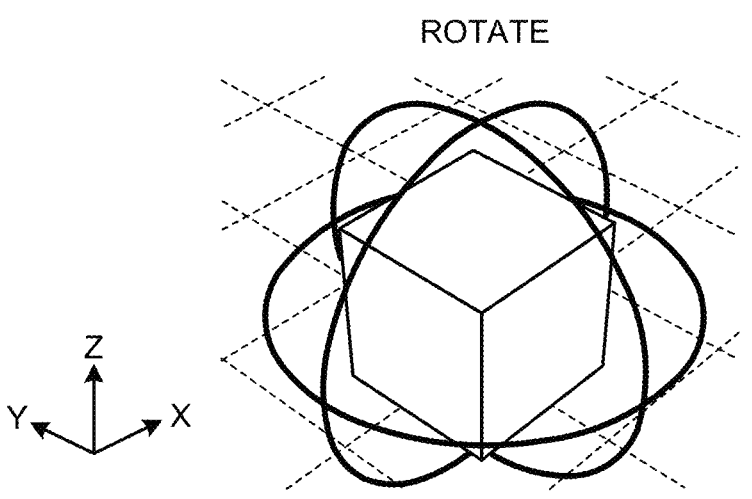
FIG. 12 is a diagram for explaining an operation of rotating a 3D block.

The user can rotate a 3D block. FIG. 12 is a diagram for explaining an operation of rotating a 3D block. At this point, the information processing device may limit operations that the user can perform to rotation after selection of axes (X-axis direction, Y-axis direction, and Z-axis direction). By limiting the degree of freedom of operation by the user, it becomes easier to operate, and as a result, the time for creating the trajectory can be reduced.

(3) Move

Figure 13:
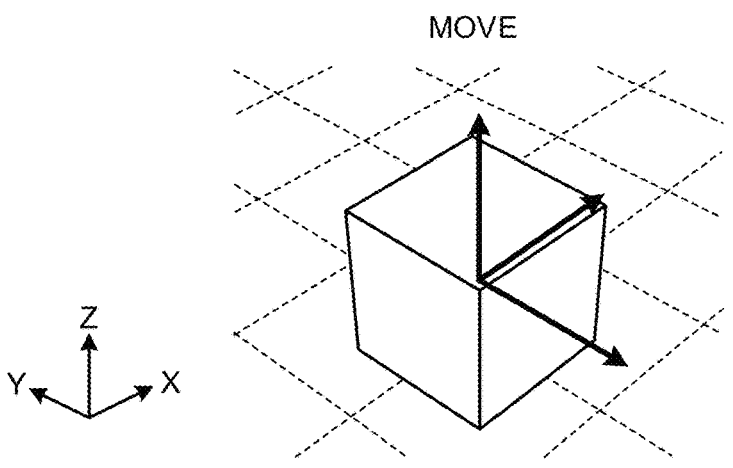
FIG. 13 is a diagram for explaining an operation of moving a 3D block.

The user is able to move a 3D block. FIG. 13 is a diagram for explaining an operation of moving a 3D block. At this point, the information processing device may limit operations that the user can perform to movement in three directions (X-axis direction, Y-axis direction, and Z-axis direction). By limiting the degree of freedom of operation by the user, it becomes easier to operate, and as a result, the time for creating the trajectory can be reduced.

(4) Synthesize

Figure 14:
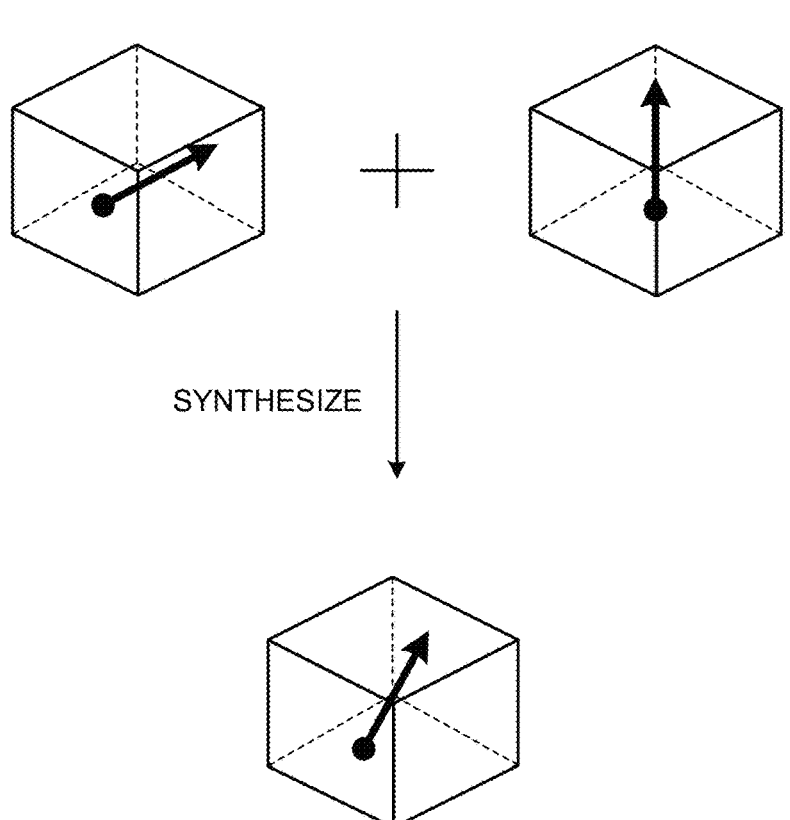
FIG. 14 is a diagram for explaining an operation of synthesizing 3D blocks.

The user can synthesize a plurality of 3D blocks. FIG. 14 is a diagram for explaining an operation of synthesizing 3D blocks. For example, the user combines one of 3D blocks displayed in the list display area with one of 3D blocks arranged in the 3D space display area. At this point, when the user selects a 3D block in the 3D space display area, the information processing device may display which 3D blocks in the list display area can be synthesized with the 3D block. For example, the information processing device may highlight only 3D blocks that are synthesizable and gray out 3D blocks that are not synthesizable.

(5) Connect

The user can connect a plurality of 3D blocks.

(Addition of 3D Block)

For example, the user can add one or more 3D blocks to the end of a plurality of 3D blocks displayed in a connected state in the time-series display area or the 3D space display area. At this point, the information processing device may determine connection between the tail block and an additional block and perform addition processing in a case where the connection is possible.

In addition, the user can add one or more 3D blocks to the head of a plurality of 3D blocks displayed in the connected state in the time-series display area or the 3D space display area. At this point, the information processing device may determine connection between the leading block and an additional block and perform addition processing in a case where the connection is possible.

(Insertion of 3D Block)

In addition, the user can insert a 3D block to a plurality of 3D blocks displayed in the connected state in the time-series display area or the 3D space display area. At this point, the information processing device may determine connection among the 3D blocks preceding and following the insertion point and the insertion block and perform the insertion processing in a case where the connection is possible.

(Deletion of 3D Block)

In addition, the user can delete one or more 3D blocks from a plurality of 3D blocks displayed in the connected state in the time-series display area or the 3D space display area. At this point, the information processing device may perform connection determination of the 3D blocks preceding and following the deletion block(s) and perform deletion processing in a case where the connection is possible.

Note that, when the user selects and operates a 3D block, the information processing device may display an editing method. For example, in a case where the user's operation is enlargement or reduction of the 3D block, the information processing device may display lines indicating directions in which enlargement or reduction can be performed (bold lines each with a black point at the tip as illustrated in FIG. 11) at a representative position of the 3D block. Furthermore, in a case where the user's operation is rotation of a 3D block, lines (bold lines illustrated in FIG. 12) indicating directions in which rotation can be performed may be displayed around the 3D block. Furthermore, in a case where the user's operation is to move a 3D block, arrows (bold arrows illustrated in FIG. 13) indicating directions in which the movement is possible may be displayed at a representative position of the 3D block. Furthermore, in a case where the user's operation is connection of 3D blocks, the information processing device may highlight faces on which the 3D blocks can be connected.

<3-2-3. Data Structure Example>

Next, a structure example of the 3D block information will be described.

As described above, the 3D block information is trajectory information preset in 3D blocks. The 3D block information includes, for example, the following information (1) to (5). The information processing device updates the following information (1) to (5) in accordance with a user's operation on a 3D block.

(1) Graphic Information

Graphic information is information of a graphic of the 3D block displayed on the screen.

(2) Representative Position Information

Representative position information is position information of the representative point of the 3D block. The representative position information is, for example, coordinate information (x, y, z) with the upper right corner of the 3D block being the origin. The default values are, for example, (0, 0, 0) and can be changed by the user. The information processing device executes movement processing on the 3D block on the basis of the representative position.

(3) Attitude Information

Attitude information indicates the current attitude of the 3D block. The attitude information indicates, for example, how much the 3D block has rotated from a reference attitude (attitude in the initial state in which the rotation operation has not been performed). The format of the attitude information may be (roll, pitch, yaw) or (x, y, z, w). The initial values are, for example, (0, 0, 0) or (0, 0, 0, 1). When a rotation operation on the 3D block is performed, the information processing device updates the attitude information in accordance with the operation.

(4) Scale Information

Scale information indicates the current size of the 3D block. The attitude information indicates, for example, how much the 3D block is enlarged or reduced in the axial directions from a reference size (the size of the initial state in which no enlargement nor reduction operation has been performed). The format of the scale information is, for example, (x, y, z). The initial values are, for example, (1, 1, 1). When the enlargement or reduction operation on the 3D block is performed, the information processing device updates the scale information in accordance with the operation.

(5) Trajectory Component Point Sequence Information

The trajectory component point sequence information indicates the trajectory preset in the 3D block. The trajectory component point sequence information is, for example, sequence information of the following information (position and attitude information and velocity information). When a synthesizing operation of 3D blocks is performed, the information processing device updates the trajectory component point sequence information in accordance with the operation.

Position and Attitude Information

The position and attitude information includes position information and attitude information. The position information is, for example, information of a relative position (x, y, z) of a trajectory component point based on the representative position information of the 3D block. The attitude information is information of the attitude of the flight vehicle 30 traveling along a trajectory (trajectory component point sequence) at the corresponding trajectory component point. The attitude information is, for example, information of the relative attitude ((roll, pitch, yaw) or (x, y, z, w)) of the flight vehicle 30 at the trajectory component point based on the current attitude of the 3D block (the attitude represented by the above-described (3) attitude information).

Velocity Information

The velocity information is information of the velocity of the flight vehicle 30 traveling along the trajectory (trajectory component point sequence) at the corresponding trajectory component point. The velocity information includes, for example, information of the translational velocity (x, y, z) and the rotational velocity (roll, pitch, yaw).

4. PROCESSING EXAMPLE

Although the action of the information processing device has been described above, various types of processing executed by the information processing device will be described below by referring to flowcharts.

The processing of the information processing device described below may be executed by any one of a plurality of devices (servers 10, terminal devices 20, and flight vehicles 30) included in the flight vehicle control system 1 or may be executed, in cooperation, by control units (information processing devices) of a plurality of devices included in the flight vehicle control system 1.

<4-1. Flight Path Generating Processing>

Figure 15:
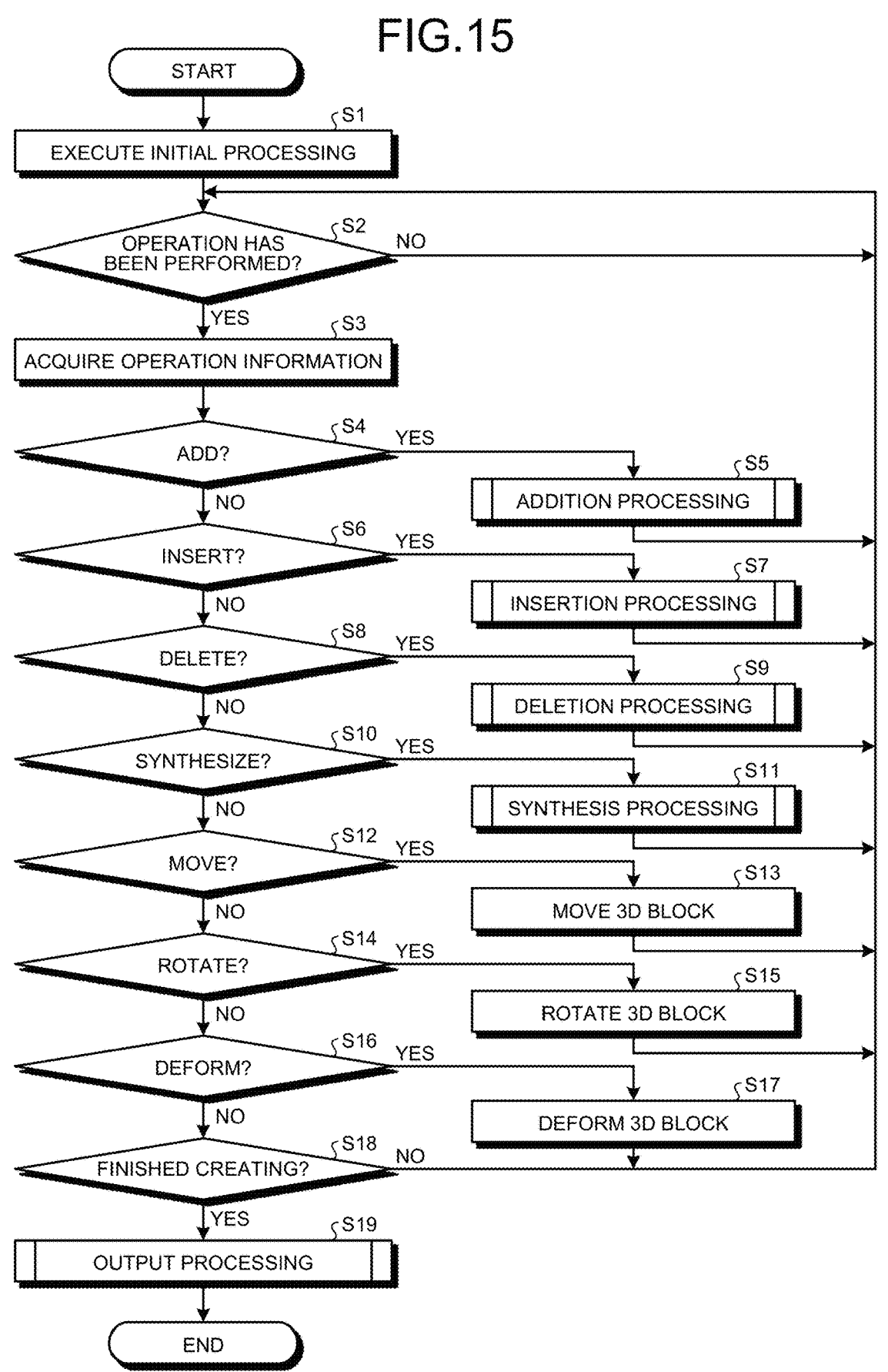
FIG. 15 is a flowchart illustrating flight path generating processing.

FIG. 15 is a flowchart illustrating flight path generating processing. The flight path generating processing is processing for generating a flight path of a flight vehicle 30. When the user activates an application for generating a flight path, the information processing device starts the flight path generating processing. Hereinafter, the flight path generating processing will be described with reference to the flowchart of FIG. 15.

First, the information processing device executes initial processing (Step S1). For example, the information processing device displays an application screen, for example, as illustrated in FIGS. 8 to 10 on a screen (for example, the display unit 26). At this point, the information processing device may display a list of 3D blocks selectable by the user on the application screen. The information processing device also initializes flight path information stored in the storage unit.

Subsequently, the information processing device determines whether the user has operated a 3D block (Step S2). If no operation has been performed (Step S2: No), the information processing device stands by until an operation is performed. If an operation has been performed (Step S2: Yes), the information processing device acquires operation information indicating the operation on the 3D block by the user (Step S3).

Next, the information processing device determines whether the user's operation indicated by the operation information is addition of the 3D block (Step S4). If the user's operation is addition of the 3D block (Step S4: Yes), the information processing device executes addition processing of the 3D block (Step S5). The addition processing will be described later.

If the user's operation is not addition of the 3D block (Step S4: No), the information processing device determines whether or not the user's operation indicated by the operation information is insertion of the 3D block (Step S6). If the user's operation is insertion of the 3D block (Step S6: Yes), the information processing device executes insertion processing of the 3D block (Step S7). The insertion processing will be described later.

If the user's operation is not insertion of the 3D block (Step S6: No), the information processing device determines whether or not the user's operation indicated by the operation information is deletion of the 3D block (Step S8). If the user's operation is deletion of the 3D block (Step S8: Yes), the information processing device executes deletion processing (Step S9). The deletion processing will be described later.

If the user's operation is not deletion of the 3D block (Step S8: No), the information processing device determines whether or not the user's operation indicated by the operation information is synthesis of the 3D block (Step S10). If the user's operation is synthesis of the 3D block (Step S10: Yes), the information processing device executes synthesis processing of the 3D block (Step S11). The synthesis processing will be described later.

If the user's operation is not synthesis of the 3D block (Step S10: No), the information processing device determines whether or not the user's operation indicated by the operation information is movement of the 3D block (Step S12). If the user's operation is movement of the 3D block (Step S12: Yes), the information processing device moves the 3D block displayed in a predetermined area (for example, the time-series display area or the 3D space display area) of the application screen in accordance with the user's operation (Step S13). For example, the information processing device determines the moving amount of the selected 3D block on the basis of the operation information and adds the determined moving amount to the representative position information of the selected 3D block.

If the user's operation is not movement of the 3D block (Step S12: No), the information processing device determines whether or not the user's operation indicated by the operation information is rotation of the 3D block (Step S14). If the user's operation is rotation of the 3D block (Step S14: Yes), the information processing device rotates the 3D block displayed in a predetermined area (for example, the 3D space display area) of the application screen in accordance with the user's operation (Step S15). For example, the information processing device determines the rotation amount of the selected 3D block on the basis of the operation information and adds the determined rotation amount to the attitude information of the selected 3D block.

If the user's operation is not rotation of the 3D block (Step S14: No), the information processing device determines whether or not the user's operation indicated by the operation information is deformation of the 3D block (for example, enlargement or reduction) (Step S16). If the user's operation is deformation of the 3D block (Step S16: Yes), the information processing device deforms the 3D block displayed in a predetermined area (for example, the 3D space display area) of the application screen in accordance with the user's operation (Step S17). For example, in a case where the deformation is enlargement or reduction, the information processing device acquires information of the scales (x, y, z) of the selected 3D block after the deformation on the basis of the operation information and replaces the scale information of the selected 3D block with the scale information that has been determined.

If the user's operation is not deformation of the 3D block (Step S14: No), the information processing device determines whether or not the user's operation indicated by the operation information is completing creation of the flight path (Step S18). If the user's operation is not completing the creation of the flight path (Step S18: No), the information processing device returns the processing to Step S2 and stands by for a user's operation. If the user's operation is completing the creation of the flight path (Step S18: Yes), the information processing device executes output processing of flight path information (Step S19). The output processing will be described later.

After performing the output processing, the information processing device ends the flight path generating processing.

<4-2. Addition Processing>

Next, the addition processing of Step S5 will be described.

Figure 16:
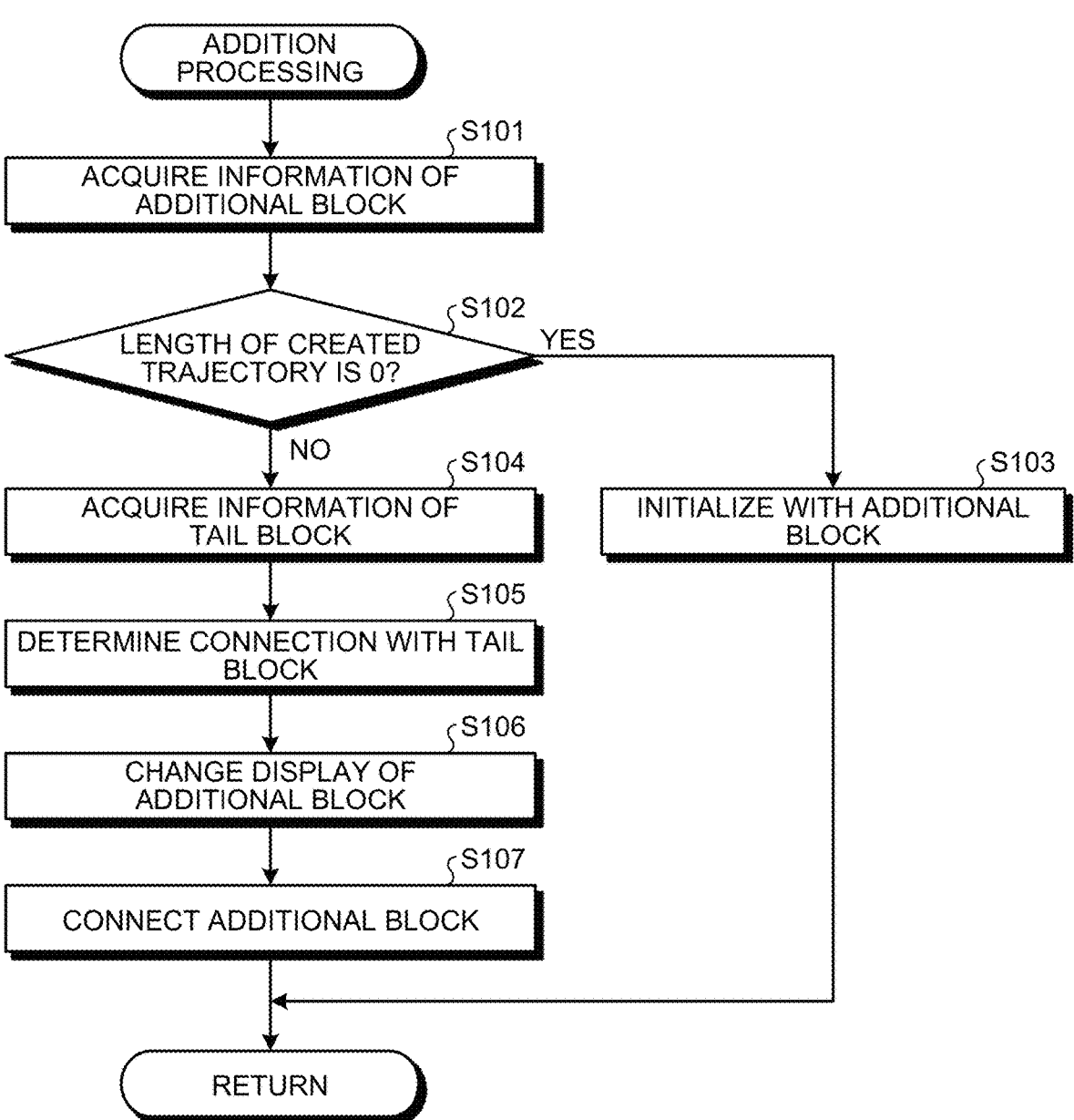
FIG. 16 is a flowchart illustrating addition processing.

The addition processing is processing of adding one or a plurality of 3D blocks selected by the user to a plurality of 3D blocks displayed in a connected state, for example, in the time-series display area or the 3D space display area in accordance with the user's operation. Note that, in the following description, the addition processing is processing of adding a 3D block to the tail of a plurality of 3D blocks. Note that the addition processing described below can be modified in such a manner as to add a 3D block to the head of a plurality of 3D blocks. FIG. 16 is a flowchart illustrating the addition processing. Hereinafter, the addition processing will be described with reference to the flowchart of FIG. 16.

First, the information processing device acquires information of the 3D block to be added (hereinafter, referred to as an additional block) (Step S101).

Subsequently, the information processing device determines whether or not the length of the flight path that has been created already (hereinafter, referred to as a created trajectory) is 0 (Step S102). For example, it is determined whether or not the number of 3D blocks already displayed in the time-series display area or the 3D space display area of the application screen is 0. If the length of the created trajectory is 0 (Step S102: Yes), the information processing device initializes the created trajectory with the additional block (Step S103).

If the length of the created trajectory is not 0 (Step S102: No), the information processing device acquires information of the 3D block (hereinafter, referred to as a tail block) at the tail of the created trajectory (Step S104). Then, the information processing device performs connection determination between the additional block and the tail block (Step S105). At this point, the determination result may be any one of the following (1) to (4).

(1) Connectable Without Deformation Nor Stopping (2) Connectable If Deformed or with Stopping (3) Connectable If with Stopping (4) Not Connectable "Connectable without deformation nor stopping" of (1) indicates that the two 3D blocks can be connected without deforming the trajectories of the two 3D blocks and without performing the action of stopping the flight vehicle 30 between the two 3D blocks.

"Connectable if deformed or with stopping" of (2) indicates that the two 3D blocks can be connected if the trajectory of one of the two 3D blocks is deformed or if the action of stopping the flight vehicle 30 is inserted between the two 3D blocks.

"Connectable if with stopping" of (3) indicates that the two 3D blocks can be connected if the action of stopping the flight vehicle 30 is inserted between the two 3D blocks to be connected.

"Not Connectable" of (4) in indicates that the two 3D blocks cannot be connected.

The information processing device outputs the determination result. For example, the information processing device displays the determination result on the user interface (application screen). Note that, in a case where the determination result is among (1) to (3) of being connectable, display of asking the user whether or not to execute the connection may be performed. At this point, in a case where the determination result is (2), it is displayed that deformation of the trajectory or a pause of the flight vehicle 30 is required for connection. In a case where the determination result is (3), it is displayed that a pause of the flight vehicle 30 is required to connect the two 3D blocks.

In a case where the user selects to connect, the information processing device changes the display of the additional block depending on a connectable form (Step S106). Then, the information processing device connects the additional block to the tail block (Step S107). The information processing device updates the flight path information to information after the connection. Note that the information processing device may add connecting trajectory information, in which the trajectory of the additional block and the trajectory of the tail block are smoothly connected, to a corresponding part of the flight path information. At this point, the information processing device may deform the trajectory of at least one of the tail block or the additional block in order to smoothly connect the trajectory of the tail block and the trajectory of the additional block.

When the update of the flight path information is completed, the information processing device returns the processing to the flight path generating processing.

21

<4-3. Insertion Processing>

Next, the insertion processing of Step S7 will be described.

Figure 17:
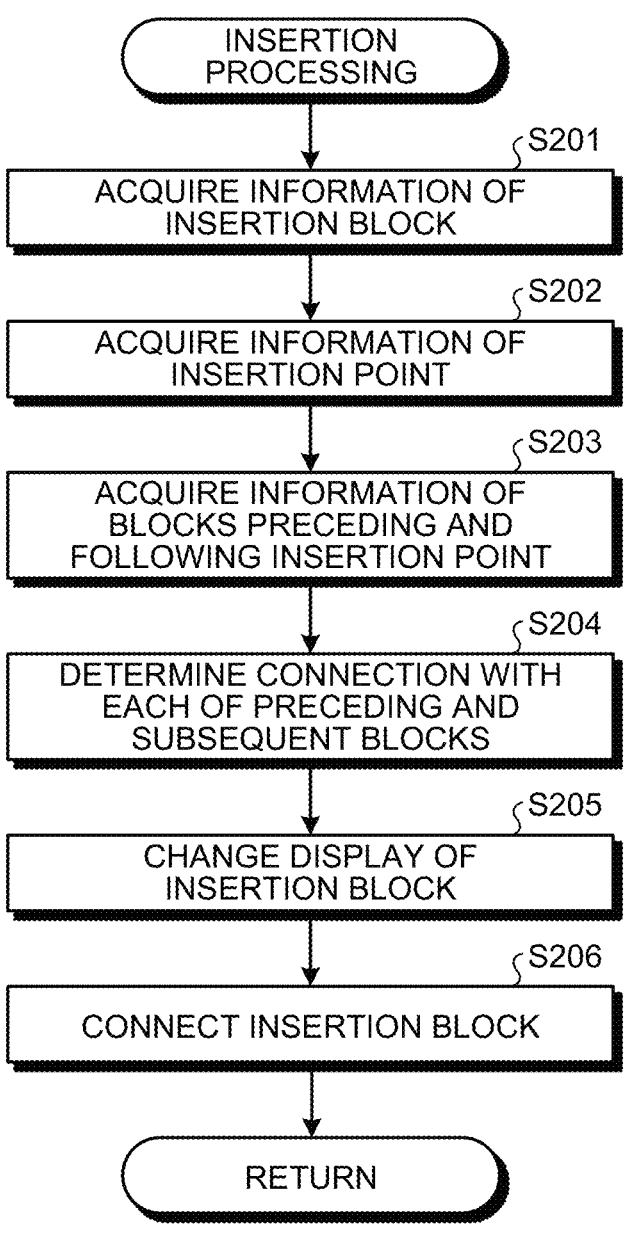
FIG. 17 is a flowchart illustrating insertion processing.

The insertion processing is processing of inserting one or a plurality of 3D blocks selected by the user to a plurality of 3D blocks displayed in a connected state, for example, in the time-series display area or the 3D space display area in accordance with the user's operation. FIG. 17 is a flowchart illustrating the insertion processing. Hereinafter, the insertion processing will be described with reference to the flowchart of FIG. 17.

First, the information processing device acquires information of the 3D block to be inserted (hereinafter, referred to as an insertion block) (Step S201).

Subsequently, the information processing device acquires information of the insertion point (Step S202). Then, the information processing device acquires information of the 3D blocks preceding and following the insertion point (hereinafter, referred to as preceding and subsequent blocks) (Step S203). Then, the information processing device performs connection determination between the insertion block and each of the preceding and subsequent blocks (Step S204). At this point, the determination result may be any one of the following (1) to (4).

(1) Connectable Without Deformation Nor Stopping (2) Connectable If Deformed or with Stopping (3) Connectable If with Stopping (4) Not Connectable The information processing device outputs the determination result. For example, the information processing device displays the determination result on the user interface (application screen). Note that, in a case where the determination result is among (1) to (3) of being connectable, display of asking the user whether or not to execute the connection may be performed. At this point, in a case where the determination result is (2), it is displayed that deformation of the trajectory or a pause of the flight vehicle 30 is required for connection. In a case where the determination result is (3), it is displayed that a pause of the flight vehicle 30 is required to connect the two 3D blocks.

In a case where the user selects to connect, the information processing device changes the display of the insertion block depending on a connectable form (Step S205). Then, the information processing device connects the insertion block to the preceding and subsequent blocks (Step S206). The information processing device updates the flight path information to information after the connection. Note that the information processing device may add the connecting trajectory information, in which the preceding and subsequent blocks are smoothly connected, to a corresponding part of the flight path information. At this point, the information processing device may deform the trajectory of at least one of the preceding and subsequent blocks in order to smoothly connect the trajectories of the preceding and subsequent blocks.

When the update of the flight path information is completed, the information processing device returns the processing to the flight path generating processing.

<4-4. Deletion Processing>

Next, the deletion processing of Step S9 will be described.

Figure 18:
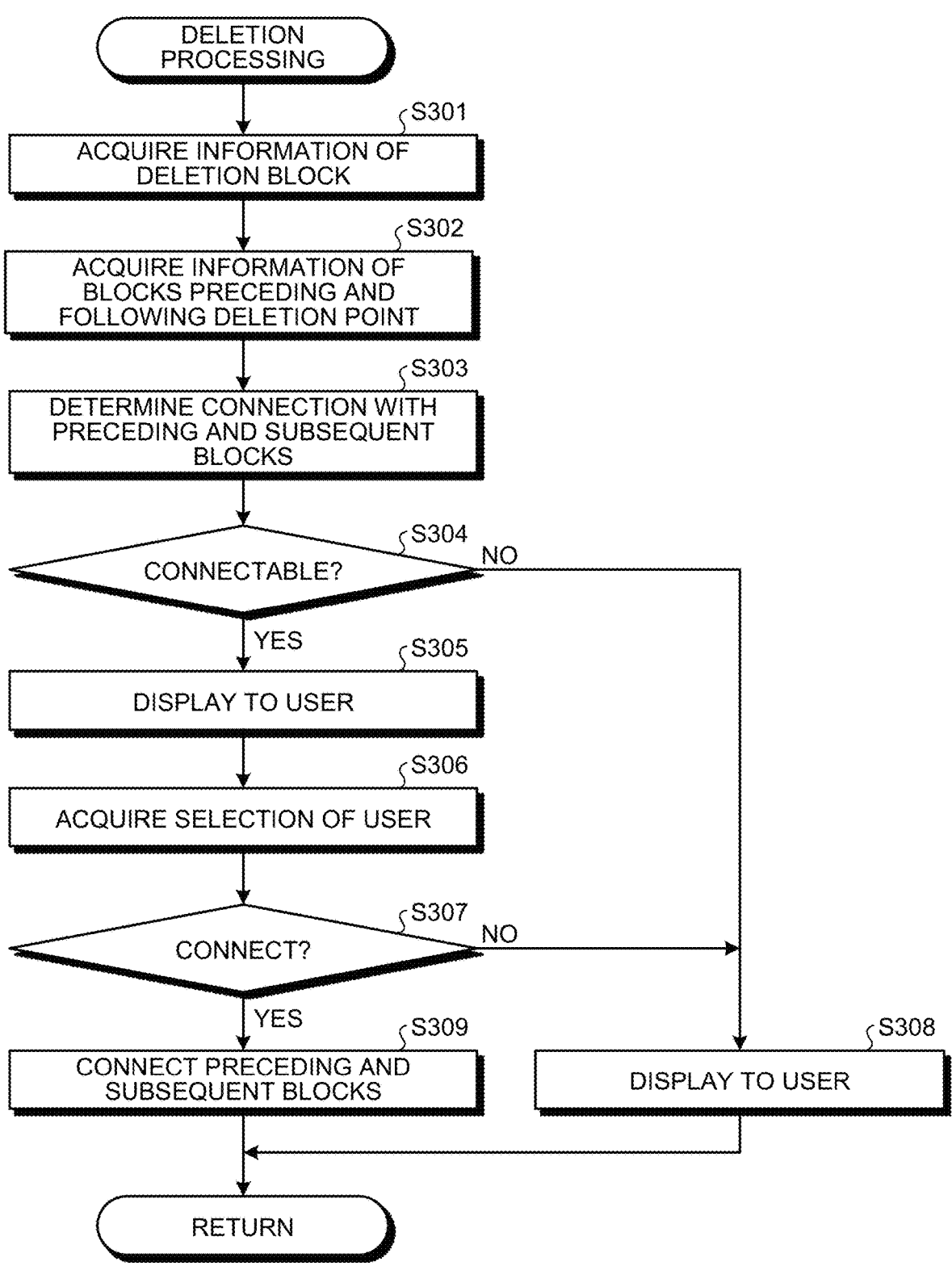
FIG. 18 is a flowchart illustrating deletion processing.

The deletion processing is processing of deleting one or a plurality of 3D blocks from a plurality of 3D blocks displayed, for example, in a connected state in the time-series display area or the 3D space display area in accordance with the user's operation. FIG. 18 is a flowchart illustrating the deletion processing. Hereinafter, the deletion processing will be described with reference to the flowchart of FIG. 18.

First, the information processing device acquires information of the 3D block to be deleted (hereinafter, referred to as a deletion block) (Step S301).

Then, the information processing device acquires information of the 3D blocks preceding and following the deletion point (hereinafter, referred to as preceding and subsequent blocks) (Step S203). Then, the information processing device performs connection determination of the preceding and subsequent blocks (Step S204). At this point, the determination result may be any one of the following (1) to (4).

(1) Connectable Without Deformation Nor Stopping (2) Connectable If Deformed or with Stopping (3) Connectable If with Stopping (4) Not Connectable Note that, if deformation of a trajectory for smooth connection between the trajectories of the deletion block and the preceding and subsequent blocks has been executed upon connecting the trajectories of the deletion block and the preceding and subsequent blocks, the information processing device may remove the deformation in advance before the connection determination and return the trajectories of the deletion block and the preceding and subsequent blocks to preset trajectories.

If the preceding and subsequent blocks cannot be connected (Step S304: No), the information processing device advances the processing to Step S308. If the preceding and subsequent blocks can be connected (Step S304: Yes), the information processing device outputs that the preceding and subsequent blocks can be connected. For example, the information processing device displays that the preceding and subsequent blocks can be connected on a user interface (application screen) (Step S305).

Subsequently, the information processing device performs display asking the user whether or not to connect the preceding and subsequent blocks. At this point, in a case where the determination result is "connectable if deformed or with stopping" of (2), it is displayed that deformation of a trajectory or a pause of the flight vehicle 30 is required to connect the preceding and subsequent blocks. In a case where the determination result is "connectable if with stopping" of (3), it is displayed that a pause of the flight vehicle 30 is required to connect the preceding and subsequent blocks. Then, the information processing device acquires the selection of the user for the question (Step S306).

If the user selects not to connect (Step S307: No), the information processing device deletes the corresponding 3D block and displays to the user that the preceding and subsequent blocks are not connected (Step S308). In this case, the information processing device may display the portion where the deletion block has been present as an insertion point of a 3D block.

On the other hand, if the user selects to connect (Step S307: Yes), the information processing device deletes the corresponding 3D block and connects the preceding and subsequent blocks (Step S308). The information processing device updates the flight path information to information after the connection. Note that the information processing device may add the connecting trajectory information, in which the preceding and subsequent blocks are smoothly connected, to a corresponding part of the flight path information. At this point, the information processing device may deform the trajectory of at least one of the preceding and subsequent blocks in order to smoothly connect the trajectories of the preceding and subsequent blocks.

When the update of the flight path information is completed, the information processing device returns the processing to the flight path generating processing.

<4-5. Synthesis Processing>

Next, the synthesis processing of Step S11 will be described.

Figure 19:
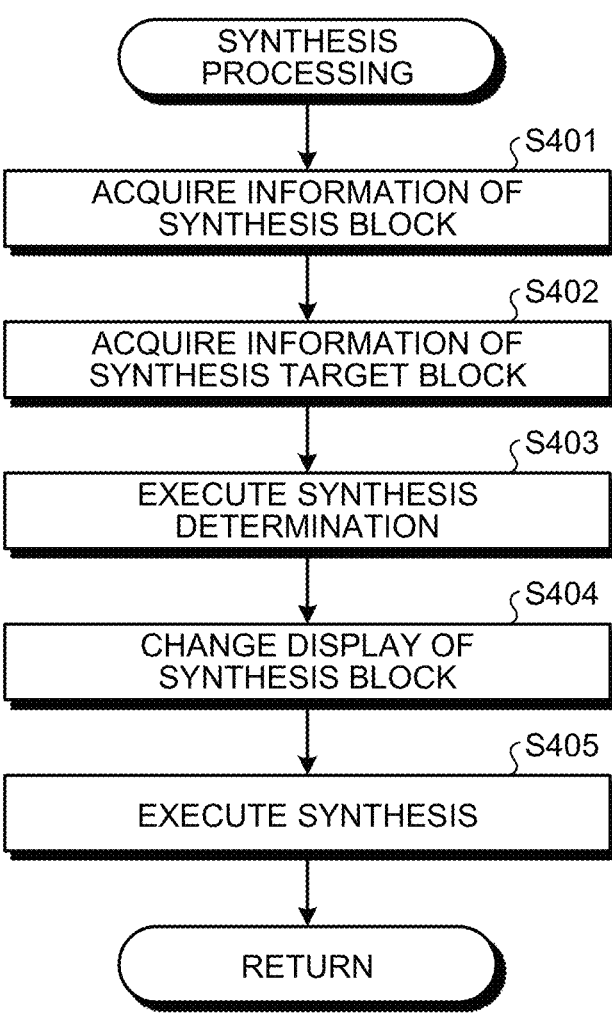
FIG. 19 is a flowchart illustrating synthesis processing.

The synthesis processing is processing of synthesizing a 3D block selected by the user with one of the plurality of 3D blocks displayed in the connected state, for example, in the time-series display area or the 3D space display area in accordance with the user's operation. FIG. 19 is a flowchart illustrating the synthesis processing. Hereinafter, the synthesis processing will be described with reference to the flowchart of FIG. 19.

First, the information processing device acquires information of a 3D block to synthesize with (hereinafter, referred to as a synthesis block) (Step S401). In addition, the information processing device acquires information of the synthesis target block (Step S402). Then, the information processing device performs synthesis determination of the synthesis block and the synthesis target block (Step S403). The synthesis determination is synthesis possibility determination between the synthesis block and the synthesis target block. The determination result is, for example, synthesizable or not synthesizable. Note that being synthesizable may include patterns of being synthesizable with conditions, such as being synthesizable if with deceleration processing.

The information processing device displays the determination result to the user. For example, the information processing device displays the determination result on the user interface (application screen). Note that, in a case where the determination result is synthesizable (or synthesizable if with deceleration processing), display asking the user whether or not to execute connection may be performed. At this point, in a case where the determination result has a condition such as "synthesizable if with deceleration processing", the information processing device may display the condition.

If the user selects to synthesize, the information processing device changes the display of the synthesis block depending on a form in which the synthesis can be performed (Step S404). Then, the information processing device synthesizes the synthesis target block with the synthesis block (Step S405). The information processing device updates the flight path information to information after the synthesis.

When the update of the flight path information is completed, the information processing device returns the processing to the flight path generating processing.

<4-6. Output Processing>

Next, the output processing of Step S19 will be described.

Figure 20:
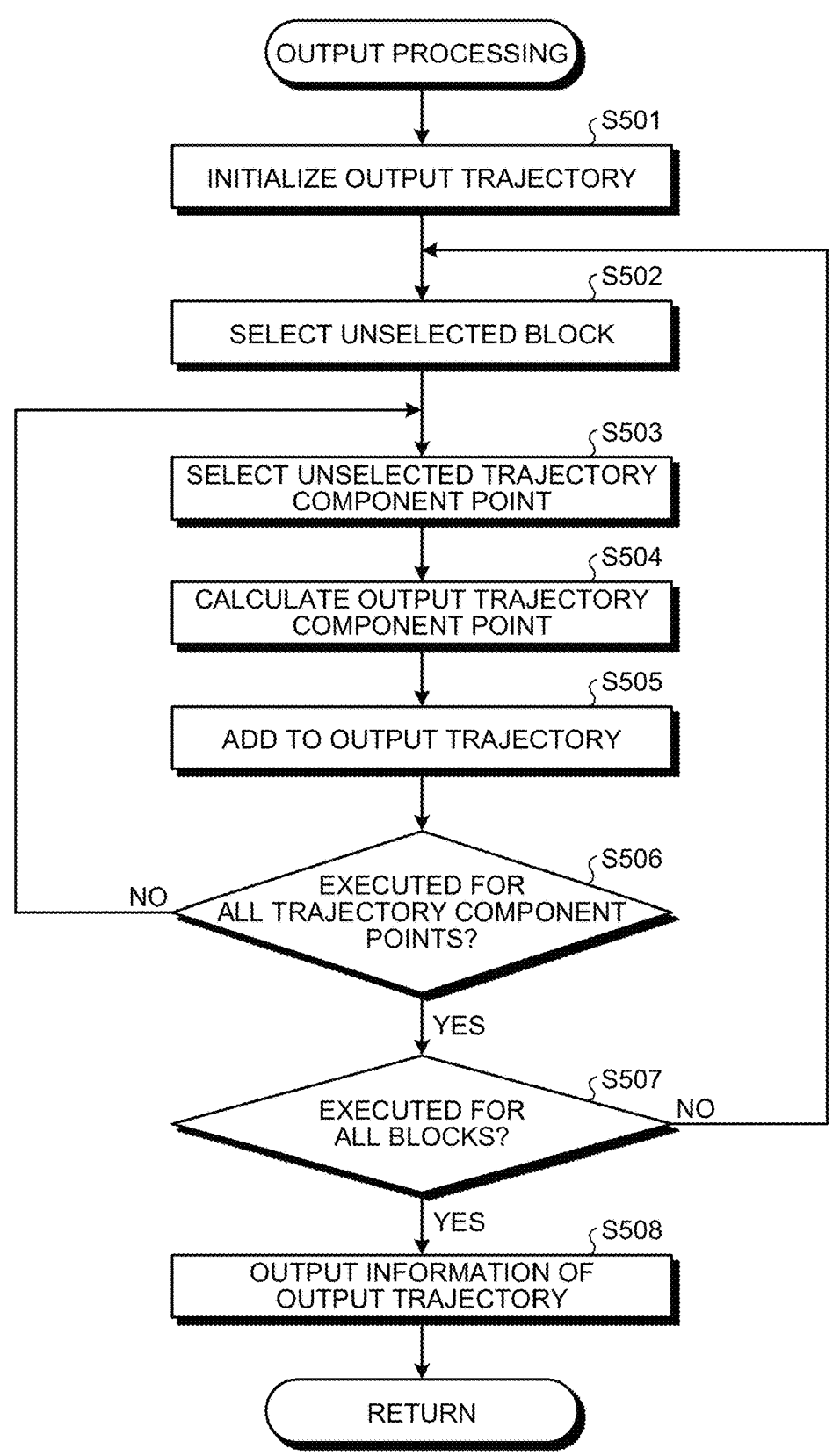
FIG. 20 is a flowchart illustrating output processing.

The output processing is processing for outputting the information of the generated flight path to the storage unit or the display unit. In the following description, the flight path output to the storage unit or the display unit may be referred to as an output trajectory. The flight vehicle 30 flies on the basis of the information of the output trajectory. FIG. 20 is a flowchart illustrating the output processing. Hereinafter, the output processing will be described with reference to the flowchart of FIG. 20.

First, the information processing device initializes information of the output trajectory (Step S501). Then, the information processing device selects one 3D block that has not yet been selected from among the plurality of connected 3D blocks (Step S502). Then, the information processing device selects one unselected trajectory component point from among a plurality of trajectory component points included in the selected 3D block (Step S503). Note that the plurality of trajectory component points as selection target may include a trajectory component point of connecting trajectory information for smoothly connecting the 3D block and a 3D block.

Subsequently, the information processing device calculates information of trajectory component points (hereinafter, referred to as output trajectory component points) constituting the output trajectory on the basis of the information of the selected trajectory component point (Step S504). For example, as the information of the output trajectory component point, information of the output trajectory component point position and information of the output component point attitude are calculated. The output trajectory component point position $P_o$ and the output component point attitude $A_o$ can be calculated by the following equations (1) and (2).

$$P_o = P_b + V_c \times S_b \times M_b \qquad (1)$$

$$A_o = A_c \times M_s \times M_b \qquad (2)$$

Here, $P_b$ denotes a block representative point position. In addition, $V_c$ denotes a vector from the block representative point to a trajectory component point. $S_b$ denotes a scale coefficient. $M_b$ denotes a block attitude matrix. $A_c$ denotes the trajectory component point attitude. $M_s$ denotes a scale correction matrix.

Next, the information processing device adds the output trajectory component point calculated in Step S504 to the output trajectory (Step S505).

Then, the information processing device determines whether or not the processing of Step S504 and step D505 has been executed for all the trajectory component points in the selected 3D block (Step S506). If the processing has not been executed (Step S506; No), the information processing device returns the processing to Step S503.

If the processing has been executed (Step S506: Yes), the information processing device determines whether or not the processing from Step S503 to Step S506 has been executed for all the blocks (Step S507). If the processing has not been executed (Step S507; No), the information processing device returns the processing to Step S502.

In a case where the processing has been executed (Step S507: Yes), the information processing device outputs information of the created output trajectory to the storage unit or the display unit (Step S508).

When the output is completed, the information processing device returns the processing to the flight path generating processing.

<4-7. Connection Determination Processing>

Next, connection determination processing will be described.

The information processing device performs connection determination of a plurality of 3D blocks in the above-described processing (for example, addition processing, insertion processing, and deletion processing). Hereinafter, an example of connection determination processing used in the above processing will be described.

In the following example, it is based on the premise that the information processing device executes connection determination of two 3D blocks. There are following four types of (1) to (4) as determination results.

(1) Connectable Without Deformation Nor Stopping
(2) Connectable If Deformed or with Stopping
(3) Connectable If with Stopping
(4) Not Connectable It is also based on the premise that the 3D blocks have the following information (1) to (2) as information regarding the connection determination (hereinafter, referred to as connection permission information).

(1) Front Connection Permission Information

Front connection permission information indicates whether or not another block is permitted to be connected to the front of a 3D block. The front connection is basically permitted. However, front connection to some special 3D block such as a takeoff block is not permitted. A takeoff block is a 3D block in which a takeoff action of the flight vehicle 30 is preset.

(2) Rear Connection Permission Information

Rear connection permission information indicates whether or not another block is permitted to be connected to the rear of a 3D block. The rear connection is basically permitted. However, rear connection to some special 3D block, such as a landing block or a return to home (RTH) block, is not permitted. A landing block is a 3D block in which a landing action of the flight vehicle 30 is preset. The RTH block is a 3D block in which the action of the flight vehicle 30 of returning to a home point is preset.

Note that, in the following description, in order to facilitate understanding, it is based on the premise that the information processing device performs connection determination of a 3D block B to a 3D block A. In this example, the 3D block A is, for example, a 3D block selected by the user as a target to which a new 3D block is connected from among the plurality of 3D blocks displayed in the time-series display area or the 3D space display area. The 3D block B is a 3D block selected by the user as a connection target to the 3D block A from the list of 3D blocks displayed in the list display area.

Figure 21:
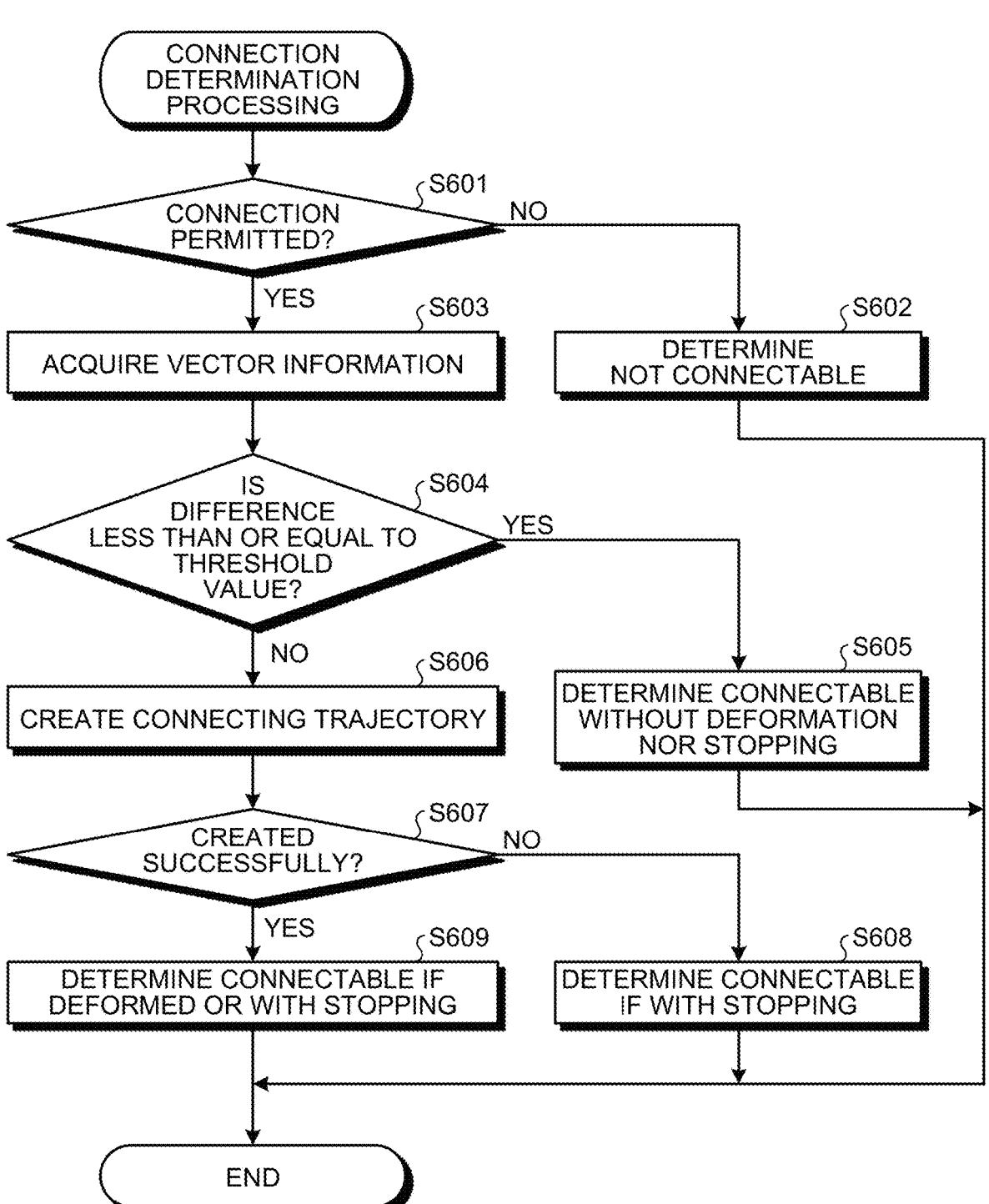
FIG. 21 is a flowchart illustrating connection determination processing.

FIG. 21 is a flowchart illustrating the connection determination processing. Hereinafter, the connection determination processing will be described with reference to the flowchart of FIG. 21.

First, the information processing device determines whether or not connection of the 3D block B to the 3D block A is permitted on the basis of the connection permission information (Step S601). For example, in a case where rear connection permission information of the 3D block A permits connection of a 3D block to the rear of the 3D block A and front connection permission information of the 3D block B permits connection of a 3D block to the front of the 3D block B, the information processing device determines that connection of the 3D block B to the 3D block A is permitted. Otherwise, the information processing device determines that the connection of the 3D block B to the 3D block A is not permitted.

If the connection of the 3D block B to the 3D block A is not permitted (Step S601: No), the information processing device determines that the connection is not possible (Step S602).

If the connection of the 3D block B to the 3D block A is permitted (Step S601: Yes), the information processing device acquires vector information set to each of the trajectory end (trajectory component point) of the 3D block A and the trajectory start end (trajectory component point) of the 3D block B (Step S603). The vector information is, for example, a six-dimensional vector indicating the velocity (translational velocity, rotational velocity) and the acceleration set to a corresponding trajectory component point.

Then, the information processing device determines whether or not the difference between the two vectors is equal to or less than a predetermined threshold value (Step S604). In a case where the difference is equal to or less than the threshold value (Step S604: Yes), the information processing device determines that connection is possible without deformation nor stopping (Step S605).

If it is not equal to or less than the threshold value (Step S604: No), the information processing device provisionally creates a connecting trajectory connecting the trajectory of the 3D block A and the trajectory of the 3D block B (Step S606). At this point, the information processing device deforms the trajectory of at least one of the 3D block A and the 3D block B in order to smoothly connect the trajectory of the 3D block A and the trajectory of the 3D block B.

The information processing device determines whether or not the creation of the trajectory has succeeded (Step S607). If the creation is not successful (Step S607: No), the information processing device determines that connection is possible if the action of pausing of the flight vehicle 30 is inserted between the two 3D blocks (Step S608). On the other hand, if the creation has succeeded (Step S607: Yes), the information processing device determines that connection is possible if a part of the trajectories of the two 3D blocks is deformed or if the action of pausing of the flight vehicle 30 is inserted between the two 3D blocks (Step S609).

When the determination is completed, the information processing device ends the connection determination processing.

<4-8. Connecting Trajectory Generating Processing>

Next, connecting trajectory generating processing will be described.

The information processing device performs connection of trajectories of a plurality of 3D blocks in the above-described processing (for example, addition processing, insertion processing, and deletion processing). Hereinafter, an example of connecting trajectory generating processing used in the above processing will be described.

In the following example, it is based on the premise that the information processing device generates a connecting trajectory connecting trajectories of two 3D blocks. As a method of generating the connecting trajectory, the following two patterns of (1) and (2) are conceived of.

(1) Deform Trajectory of at Least One of Two 3D Blocks (2) Insert Action of Pause of Flight Vehicle 30 Between Two 3D Blocks In the method of (1), there may be a case where it is difficult to create the connecting trajectory, whereas in the method of (2), it is always possible to create the connecting trajectory. In the connecting trajectory generating processing described below, it is based on the premise that the information processing device generates the connecting trajectory by the method of (1).

Note that, in the following description, in order to facilitate understanding, it is based on the premise that the information processing device connects the 3D block B to the 3D block A. In this example, the 3D block A is, for example, a 3D block selected by the user as a target to which a new 3D block is connected from among the plurality of 3D blocks displayed in the time-series display area or the 3D space display area. The 3D block B is a 3D block selected by the user as a connection target to the 3D block A from the list of 3D blocks displayed in the list display area.

Figure 22:
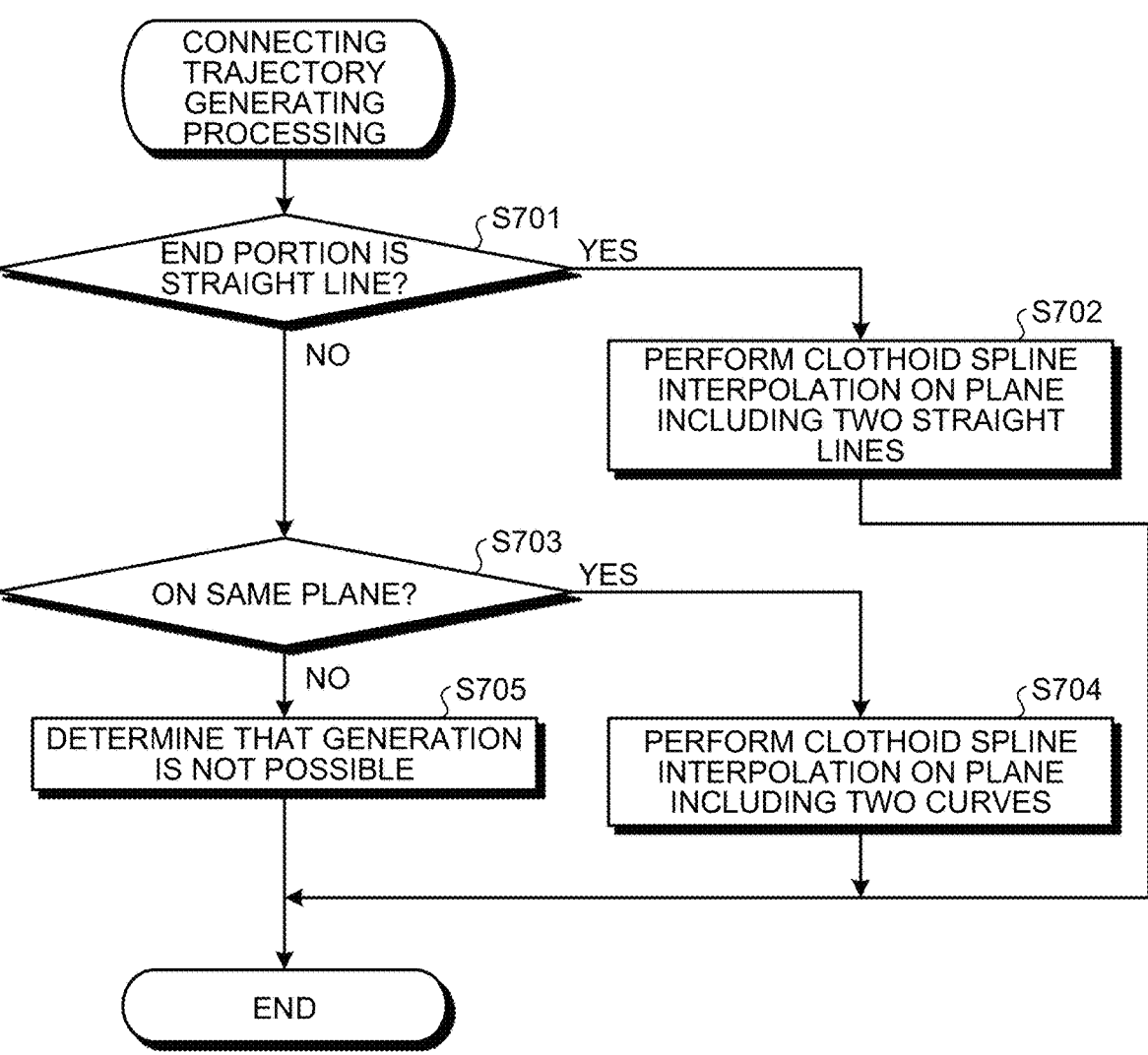
FIG. 22 is a flowchart illustrating connecting trajectory generating processing.

FIG. 22 is a flowchart illustrating the connecting trajectory generating processing. Hereinafter, the connecting trajectory generating processing will be described with reference to the flowchart of FIG. 22.

First, the information processing device determines whether or not the trajectory end portions on the connection sides of the two 3D blocks are both straight lines. More specifically, it is determined whether or not the end of the trajectory of the 3D block A is a straight line and whether or not the start end of the trajectory of the 3D block B is a straight line (Step S701).

In a case where the two trajectory end portions are both straight lines (Step S701: Yes), the information processing device connects the trajectories of the 3D block A and the 3D block B by performing clothoid spline interpolation on the trajectories on a plane that includes the two straight lines (Step S702).

If at least one of the two trajectory end portions is not a straight line, namely, if at least one of the two trajectory end portions is a curve (Step S701: No), it is determined whether or not the two trajectory end portions are included in the same plane (Step S703). If the two trajectory end portions are included in the same plane (Step S703: Yes), the information processing device connects the trajectories of the 3D block A and the 3D block B by performing the clothoid spline interpolation on the trajectories on the plane that includes the two trajectory end portions. For example, in a case where both of the two trajectory end portions are curved, the information processing device connects the trajectories of the 3D block A and the 3D block B by performing the clothoid spline interpolation on the trajectories on a plane that includes the two curves (Step S704).

If the two trajectory end portions are not included in the same plane (Step S703: No), the information processing device determines that generation of a connecting trajectory is impossible (Step S705). In this case, the information processing device may connect the two 3D blocks by inserting an action of pausing of the flight vehicle 30 between the two 3D blocks. Note that although the processing becomes complicated, it is possible to connect the two 3D blocks even without the action of pausing. Therefore, even in a case where the two trajectory end portions are not included in the same plane, the information processing device may generate a connecting trajectory depending on selection of the user or a developer.

When the generation of the connecting trajectory is completed, the information processing device ends the connecting trajectory generating processing.

<4-9. Synthesis Determination Processing>

Next, synthesis determination processing will be described.

The information processing device performs synthesis determination of a plurality of 3D blocks in the above-described processing (for example, synthesis processing). Hereinafter, an example of synthesis determination processing used in the above processing will be described.

In the following example, it is based on the premise that the information processing device executes the synthesis determination of two 3D blocks. There are two patterns of determination results: synthesizable and not synthesizable.

It is also based on the premise that the 3D blocks have synthesis permission information as information regarding synthesis determination. The synthesis permission information indicates whether or not to permit another block to be synthesized with the 3D block. The synthesis is basically permitted. However, synthesis of a 3D block with some special 3D block, such as the takeoff blocks, the landing blocks, or the RTH blocks, is not permitted.

Note that, in the following description, in order to facilitate understanding, it is based on the premise that the information processing device performs synthesis determination of a 3D block B with a 3D block A. In this example, the 3D block A is, for example, a 3D block selected by the user as a target with which a new 3D block is synthesized from among the plurality of 3D blocks displayed in the time-series display area or the 3D space display area. The 3D block B is a 3D block selected by the user as a connection target to the 3D block A from the list of 3D blocks displayed in the list display area.

Figure 23:
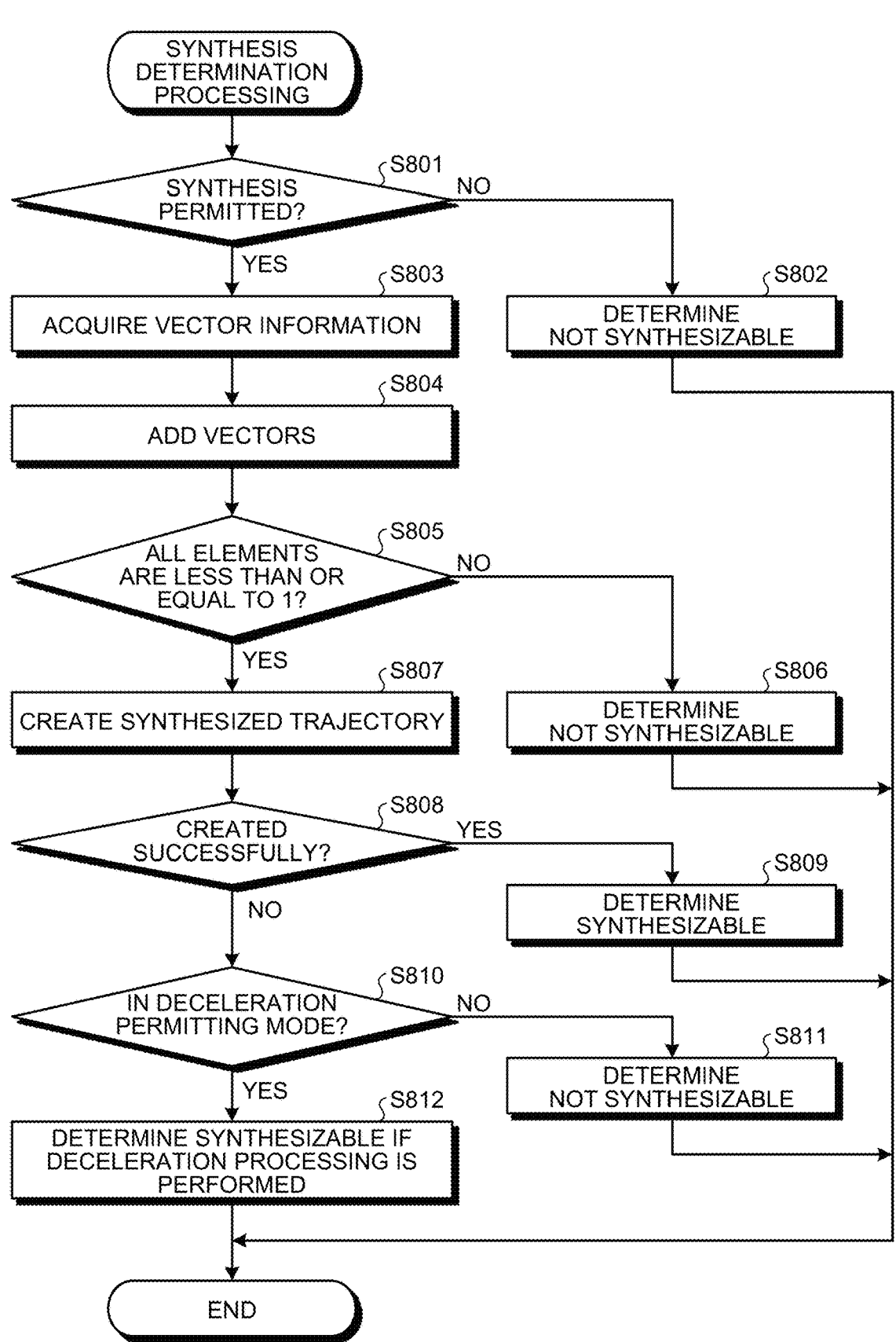
FIG. 23 is a flowchart illustrating synthesis determination processing.

FIG. 23 is a flowchart illustrating the synthesis determination processing. Hereinafter, the synthesis determination processing will be described with reference to the flowchart of FIG. 23.

First, the information processing device determines whether or not synthesis of the 3D block B with the 3D block A is permitted on the basis of the synthesis permission information (Step S801). For example, in a case where the synthesis permission information of both the 3D block A and the 3D block B permit synthesis, the information processing device determines that the synthesis of the 3D block B with the 3D block A is permitted. Otherwise, the information processing device determines that the synthesis of the 3D block B to the 3D block A is not permitted.

If the synthesis of the 3D block B with the 3D block A is not permitted (Step S801: No), the information processing device determines that the synthesis is not possible (Step S802).

If the synthesis of the 3D block B with the 3D block A is permitted (Step S801: Yes), the information processing device acquires information of a moving element vector of each of the 3D block A and the 3D block B (Step S803). Then, the information processing device adds the two moving element vectors (Step S804).

Then, the information processing device determines whether or not all the elements of the added moving element vector are equal to or less than 1 (Step S805). Incidentally, in a case where all the elements are equal to or less than 1, it means that the two 3D blocks have no common element in any of the X axis, the Y axis, and the X axis, and thus, the two 3D blocks are synthesizable. For example, if the 3D block A includes movement in the X axis and the 3D block B includes movement in the YZ plane, the two 3D blocks are synthesizable. On the other hand, if not all the elements are equal to or less than 1, it means that the two 3D blocks have a common element, and thus the two 3D blocks are not synthesizable. Note that although synthesis is possible in principle, the present embodiment does not allow synthesis due to a high risk of unexpected motions.

In a case where not all the elements are equal to or less than 1 (Step S805: No), the information processing device determines that synthesis is not possible (Step S806).

In a case where all the elements are equal to or less than 1 (Step S805: Yes), the information processing device provisionally creates a synthesized trajectory obtained by synthesizing the trajectory of the 3D block A and the trajectory of the 3D block B (Step S807).

The information processing device determines whether or not creation of the synthesized trajectory has succeeded (Step S808). At this point, if the velocity (translational velocity and rotational velocity) and the acceleration of the created trajectory do not exceed the threshold value, the information processing device may determine that the creation of the synthesized trajectory has succeeded and, in a case where any element has exceeded the threshold value, may determine that the creation of the synthesized trajectory has failed.

In a case where creation of the synthesized trajectory has succeeded (Step S808: Yes), the information processing device determines that the two 3D blocks are synthesizable (Step S809).

If the creation of a synthesized trajectory has not succeeded (Step S808: No), the information processing device determines whether or not a deceleration permitting mode is set (Step S810).

If the deceleration permitting mode is not set (Step S810: No), it is determined that the two 3D blocks are not synthesizable (Step S811).

If it is in the deceleration permitting mode (Step S810: Yes), it is determined that the two 3D blocks are synthesizable if deceleration processing is performed (Step S812). For example, the information processing device determines that the two 3D blocks are synthesizable by decelerating the entirety to keep pace with an element that exceeds the threshold value the most.

When the determination is completed, the information processing device ends the connection determination processing.

<4-10. Synthesized Trajectory Generating Processing>

Next, the synthesized trajectory generating processing will be described.

The information processing device performs synthesis of a plurality of 3D blocks in the above-described processing (for example, synthesis processing). Hereinafter, an example of synthesized trajectory generating processing used in the above processing will be described. In the following example, it is based on the premise that the information processing device generates a synthesized trajectory obtained by synthesizing trajectories of two 3D blocks.

Note that, in the following description, in order to facilitate understanding, it is based on the premise that the information processing device synthesizes a 3D block A and a 3D block B. In this example, the 3D block A is, for example, a 3D block selected by the user as a target with which a new 3D block is synthesized from among the plurality of 3D blocks displayed in the time-series display area or the 3D space display area. The 3D block B is a 3D block selected by the user as a synthesis target with the 3D block A from the list of 3D blocks displayed in the list display area.

Figure 24:
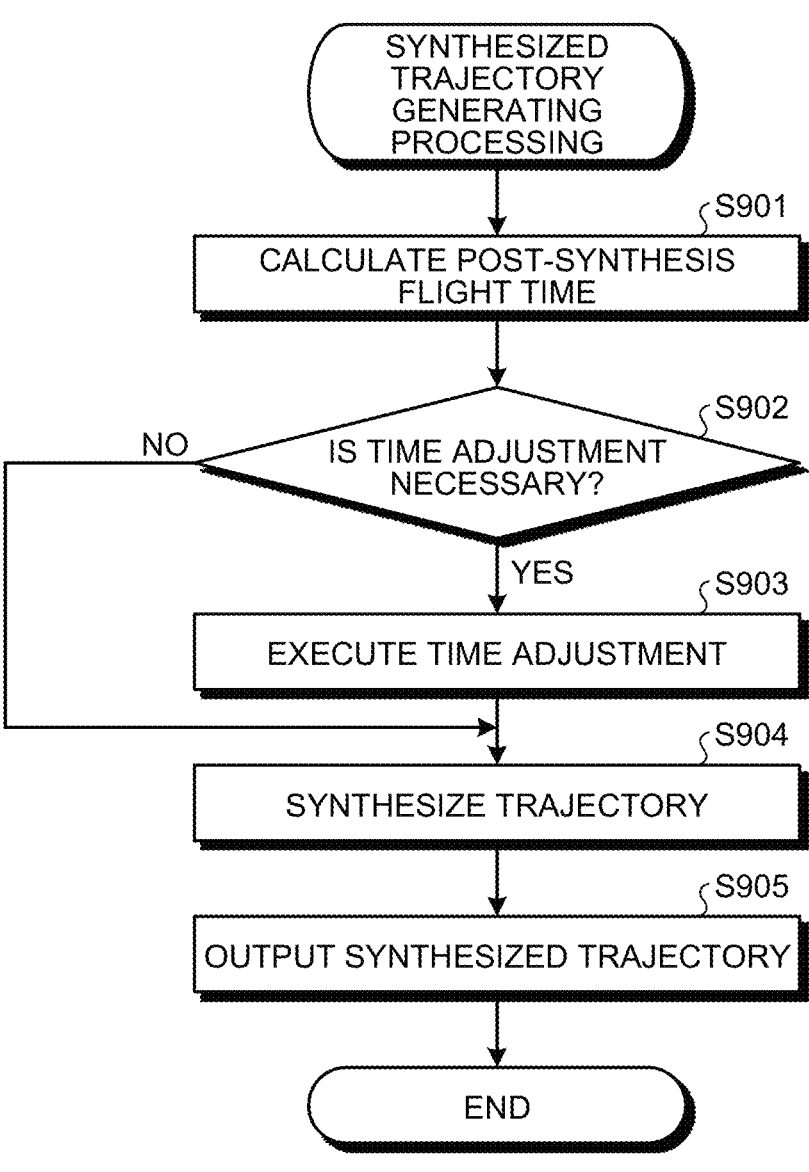
FIG. 24 is a flowchart illustrating synthesized trajectory generating processing.

FIG. 24 is a flowchart illustrating the synthesized trajectory generating processing. Hereinafter, the synthesized trajectory generating processing will be described with reference to the flowchart of FIG. 24.

First, the information processing device calculates a flight time after synthesizing the two 3D blocks (Step S901). At this point, the information processing device sets the longer one of the flight time of the 3D block A and the flight time of the 3D block B as a post-synthesis flight time.

Subsequently, the information processing device determines whether or not time adjustment is necessary (Step S902). At this point, if either the flight time of the 3D block A or the flight time of the 3D block B is different from the post-synthesis flight time, the information processing device determines that time adjustment is necessary, and if both are same as the post-synthesis flight time, the information processing device determines that time adjustment is not necessary.

If the time adjustment is not necessary (Step S902: No), the information processing device advances the processing to Step S904. If the time adjustment is necessary (Step S902: Yes), the information processing device executes the time adjustment (Step S903). Specifically, the information processing device decelerates the velocity of a 3D block having a shorter flight time so that the flight time of the 3D block having the shorter flight time matches the post-synthesis flight time. For example, in a case where the flight time is multiplied by R, the information processing device sets the velocity to 1/R times.

Then, the information processing device synthesizes the trajectories of the two 3D blocks (Step S904). For example, the information processing device sets the flight time as an index and adds positions and velocity command values for a trajectory component point having the same index of the two 3D blocks.

Then, the information processing device outputs the generated synthesized trajectory to the storage unit or the display unit (Step S905).

When the output of the synthesized trajectory is completed, the information processing device ends the connecting trajectory generating processing.

5. MODIFICATIONS

Note that the above embodiments are examples, and various modifications and applications can be made.

For example, in the above-described embodiments, the 3D blocks are rectangular parallelepipeds or cubes; however, the 3D blocks are not limited to a rectangular parallelepiped or a cube and may be, for example, a sphere or a cylindrical object.

Furthermore, in the above-described embodiments, the 3D space display area is displayed in which 3D blocks can be arranged, and a grid of any size such as the grid indicated by broken lines in FIGS. 11 to 13 may be displayed in the 3D space display area. At this point, the information processing device may cause the 3D block to snap to the grid when the user moves a 3D block.

Furthermore, the information processing device may display, on the screen, an output trajectory generated by the user by connecting or synthesizing 3D blocks. At this point, the information processing device may display the output trajectory with color gradation depending on the velocity so that the user can recognize the velocity of the flight vehicle 30. For example, the information processing device may display the output trajectory with gradation in which the maximum velocity is green and the minimum velocity is green.

Furthermore, in the above-described embodiment, the information processing device displays the determination result as to whether or not the two 3D blocks are connectable on the application screen; however, the display control unit may display information of a combination of connectable 3D blocks as the determination result. For example, the information processing device may perform the connection determination for all possible combinations among the plurality of 3D blocks displayed in the list display area and display a list of information of pairs of 3D blocks determined as being connectable. Furthermore, when the user selects one 3D block, one or a plurality of 3D blocks connectable to the 3D block may be highlighted among the plurality of 3D blocks displayed in the list display area.

Furthermore, in the above-described embodiment, the information processing device displays, on the application screen, the determination result as to whether or not the two 3D blocks are connectable without insertion of a pause; however, the display control unit may display information of a combination of 3D blocks that are connectable without insertion of a pause as the determination result. For example, the information processing device may perform the connection determination for all possible combinations among the plurality of 3D blocks displayed in the list display area and display a list of information of pairs of 3D blocks determined as being connectable without insertion of a pause. Furthermore, when the user selects one 3D block, one or a plurality of 3D blocks connectable to the 3D block without insertion of a pause may be highlighted among the plurality of 3D blocks displayed in the list display area.

Furthermore, in the above-described embodiment, the information processing device displays the determination result as to whether or not the two 3D blocks are connectable without deformation on the application screen; however, the display control unit may display information of a combination of 3D blocks that are connectable without deformation as the determination result. For example, the information processing device may perform the connection determination for all possible combinations among the plurality of 3D blocks displayed in the list display area and display a list of information of pairs of 3D blocks determined as being connectable without deformation. Furthermore, when the user selects one 3D block, one or a plurality of 3D blocks connectable to the 3D block without deformation may be highlighted among the plurality of 3D blocks displayed in the list display area.

Furthermore, in the above-described embodiment, the information processing device displays the determination result as to whether or not the two 3D blocks are synthesizable on the application screen; however, the display control unit may display information of a combination of synthesizable 3D blocks as the determination result. For example, the information processing device may perform synthesis determination for all possible combinations among the plurality of 3D blocks displayed in the list display area and display a list of information of pairs of 3D blocks determined as being synthesizable. Furthermore, when the user selects one 3D block, one or a plurality of 3D blocks synthesizable with the 3D block may be highlighted among the plurality of 3D blocks displayed in the list display area.

A control device that controls a server 10, a terminal device 20, or a flight vehicle 30 of the present embodiment may be implemented by a dedicated computer system or a general-purpose computer system.

For example, a communication program for executing the above operations is stored and distributed in a computer-readable recording medium such as an optical disc, a semiconductor memory, a magnetic tape, or a flexible disk. Moreover, for example, the control device is configured by installing the program in a computer and executing the above processing. In this case, the control device may be a device (for example, a personal computer) external to the server 10, the terminal device 20, or the flight vehicle 30. Furthermore, the control device may be an internal device of the server 10, the terminal device 20, or the flight vehicle 30 (for example, the control unit 13, the control unit 23, or the control unit 33).

In addition, the communication program may be stored in a disk device included in a server device on a network such as the Internet so that the communication program can be downloaded to a computer. In addition, the above functions may be implemented by collaborative operation between an operating system (OS) and application software. In this case, a portion other than the OS may be stored in a medium and distributed, or a portion other than the OS may be stored in a server device to allow a computer to download it, for example.

Among the pieces of processing described in the above embodiments, all or a part of processing described as that performed automatically can be performed manually, or all or a part of processing described as that performed manually can be performed automatically by a known method. In addition, a processing procedure, a specific name, and information including various types of data or parameters illustrated in the above or in the drawings can be modified as desired unless otherwise specified. For example, various types of information illustrated in the drawings are not limited to the information illustrated.

In addition, each component of each device illustrated in the drawings is conceptual in terms of function and is not necessarily physically configured as illustrated in the drawings. That is, the specific form of distribution and integration of devices is not limited to those illustrated in the drawings, and all or a part thereof can be functionally or physically distributed or integrated in any unit depending on various loads, use status, and the like. Note that this configuration by distribution and integration may be performed dynamically.

In addition, the above embodiments can be combined as appropriate as long as the processing content does not contradict each other. In addition, the order of the steps illustrated in the flowcharts of the above embodiments can be modified as appropriate.

Furthermore, for example, the present embodiment can be implemented as any configuration including a device or a system, for example, a processor such as a system large scale integration (LSI), a module using a plurality of processors or the like, a unit using a plurality of modules or the like, a set or the like (namely, some components of a device) obtained by further adding another function to a unit.

Note that, in the present embodiment, a system refers to a set of a plurality of components (devices, modules (parts), etc.), and it does not matter whether or not all the components are in the same housing. Therefore, a plurality of devices housed in separate housings and coupled via a network, and one device in which a plurality of modules is housed in one housing are both systems.

Furthermore, for example, the present embodiment can adopt a configuration of cloud computing in which one function is shared and processed by a plurality of devices in cooperation via a network.

6. CONCLUSION

As described above, according to an embodiment of the present disclosure, an information processing device acquires operation information for one or a plurality of 3D blocks selected from among a plurality of virtual 3D blocks in each of which a trajectory of a flight vehicle 30 is preset. Then, the information processing device executes connection or synthesis processing of two or more 3D blocks on the basis of the operation information and outputs information of the flight path of the flight vehicle generated on the basis of the processing result to the storage unit. The flight vehicle 30 flies in accordance with the information of the flight path that has been generated. As a result, the user can easily generate the flight path of the flight vehicle. For example, the user can input the flight path of the flight vehicle with a small number of times of viewpoint conversion even on a two-dimensional screen. As a result, the user can generate the flight path of the flight vehicle with a short creation time.

Furthermore, the information processing device according to the present embodiment determines as to whether or not connection or synthesis processing of a plurality of 3D blocks is possible and displays the determination result on the display unit. As a result, the user can generate the flight path of the flight vehicle even more easily.

Although the embodiments of the present disclosure have been described above, the technical scope of the present disclosure is not limited to the above embodiments as they are, and various modifications can be made without departing from the gist of the present disclosure. In addition, components of different embodiments and modifications may be combined as appropriate.

Furthermore, the effects of the embodiments described herein are merely examples and are not limiting, and other effects may be achieved.

Note that the present technology can also have the following configurations.

(1)

An information processing method executed by one processor or executed by a plurality of processors in cooperation, the method comprising:

an acquisition step of acquiring operation information for one or a plurality of 3D blocks selected from among a plurality of virtual 3D blocks in which different trajectories of a flight vehicle are preset;

a generation step of executing connection processing or synthesis processing of two or more 3D blocks on a basis of the operation information; and an output step of outputting information of a flight path of the flight vehicle generated by the processing.

(2)

The information processing method according to (1), further comprising:

a determination step of determining whether or not it is possible to perform connection or synthesis processing of the two or more 3D blocks; and a display control step of displaying a result of the determination.

(3)

The information processing method according to (2), wherein the display control step displays a user interface for a user to execute an operation on the one or the plurality of 3D blocks and displays the result of the determination on the user interface.

(4)

The information processing method according to (3), wherein the determination step determines whether or not two 3D blocks selected from among the plurality of virtual 3D blocks are connectable, and the display control step displays a determination result as to whether or not the two 3D blocks are connectable.

(5)

The information processing method according to (3), wherein the determination step determines a combination of connectable 3D blocks from among the plurality of virtual 3D blocks, and the display control step displays, as a result of the determination, information of the combination of the connectable 3D blocks.

(6)

The information processing method according to (3), wherein the determination step determines whether or not an action of a pause of the flight vehicle is required between two 3D blocks in order to connect the two 3D blocks selected from among the plurality of virtual 3D blocks, and the display control step displays a determination result as to whether or not the action of the pause is required.

(7)

The information processing method according to (3), wherein the determination step determines a combination of 3D blocks that are connectable without requiring an action of a pause of the flight vehicle from among the plurality of virtual 3D blocks, and the display control step displays, as a result of the determination, information of the combination of the 3D blocks that are connectable without requiring the action of the pause.

(8)

The information processing method according to (3), wherein the determination step determines whether or not deformation of a trajectory of at least one of two 3D blocks selected from among the plurality of virtual 3D blocks is required in order to connect the two 3D blocks, and the display control step displays a determination result as to whether or not the deformation is required.

(9)

The information processing method according to (3), wherein the determination step determines a combination of 3D blocks that are connectable without deformation from among the plurality of virtual 3D blocks, and the display control step displays, as a result of the determination, information of the combination of the 3D blocks that are connectable without deformation.

(10)

The information processing method according to (3), wherein the determination step determines whether or not two 3D blocks selected from among the plurality of virtual 3D blocks are synthesizable, and the display control step displays a determination result as to whether or not the two 3D blocks are synthesizable.

(11)

The information processing method according to (3), wherein the determination step determines a combination of synthesizable 3D blocks from among the plurality of virtual 3D blocks, and the display control step displays, as a result of the determination, information of the combination of the synthesizable 3D blocks.

(12)

The information processing method according to any one of (1) to (11), wherein the generation step executes the connection processing of the two or more 3D blocks on a basis of the operation information.

(13)

The information processing method according to (12), wherein the connection processing includes processing of connecting one or a plurality of 3D blocks at a head or a tail of the plurality of connected 3D blocks.

(14)

The information processing method according to (12) or (13), wherein the connection processing includes processing of inserting one or a plurality of 3D blocks to the plurality of connected 3D blocks.

(15)

The information processing method according to any one of (12) to (14), wherein the connection processing includes processing of deleting one or a plurality of 3D blocks from a plurality of connected 3D blocks and then connecting 3D blocks preceding and following the deleted 3D block.

(16)

The information processing method according to any one of (1) to (15), wherein the generation step executes the synthesis processing of the two or more 3D blocks on a basis of the operation information.

(17)

The information processing method according to any one of (1) to (16), wherein the output step displays a plurality of connected or synthesized 3D blocks in a virtual 3D space corresponding to a real space.

(18)

The information processing method according to any one of (1) to (17), wherein the output step displays a plurality of connected or synthesized 3D blocks in time series.

(19)

An information processing program for causing one or a plurality of computers to function as:

an acquisition unit that acquires operation information for one or a plurality of 3D blocks selected from among a plurality of virtual 3D blocks in which different trajectories of a flight vehicle are preset;

a generation unit that executes connection processing or synthesis processing of two or more 3D blocks on a basis of the operation information; and an output unit that outputs information of a flight path of the flight vehicle generated by the processing.

(20)

An information processing device comprising:

an acquisition unit that acquires operation information for one or a plurality of 3D blocks selected from among a plurality of virtual 3D blocks in which different trajectories of a flight vehicle are preset;

a generation unit that executes connection processing or synthesis processing of two or more 3D blocks on a basis of the operation information; and an output unit that outputs information of a flight path of the flight vehicle generated by the processing.

REFERENCE SIGNS LIST

1 FLIGHT VEHICLE CONTROL SYSTEM
10 SERVER
20 TERMINAL DEVICE
30 FLIGHT VEHICLE
11, 21, 31 COMMUNICATION UNIT
12, 22, 32 STORAGE UNIT
13, 23, 33 CONTROL UNIT
24, 34 SENSOR UNIT
25 OPERATION UNIT
26 DISPLAY UNIT
35 IMAGING UNIT
36 POWER UNIT
131, 231, 331 ACQUISITION UNIT
132, 232, 332 DETERMINATION UNIT
133, 233, 333 GENERATION UNIT
134, 234, 334 OUTPUT UNIT
135, 235, 335 DISPLAY CONTROL UNIT
N NETWORK

The invention claimed is:

1. An information processing method executed by one or more processors in cooperation, the method comprising:

performing control of flight operations of an unmanned flight vehicle, the control of the flight operations comprising:

acquiring operation information of two or more virtual 3D blocks selected from a plurality of virtual 3D blocks, each of the plurality of virtual 3D blocks corresponding to a preset block-specific flight trajectory;

processing the two or more virtual 3D blocks of the plurality of virtual 3D blocks on a basis of the operation information to generate a flight path of the unmanned flight vehicle, the processing comprising one of connection processing or synthesis processing of the two or more virtual 3D blocks; and outputting information about the generated flight path.

2. The information processing method according to claim 1, further comprising:

determining whether or not it is possible to perform the connection processing or synthesis processing of the two or more virtual 3D blocks; and displaying a result of the determining whether or not it is possible to perform the connection processing or the synthesis processing of the two or more virtual 3D blocks.

3. The information processing method according to claim 2, wherein the displaying comprises displaying a user interface for a user to execute the processing of the two or more virtual 3D blocks.

4. The information processing method according to claim 3, wherein the determining comprises determining whether or not the two or more virtual 3D blocks are connectable, and the displaying comprises displaying information as whether or not the two or more virtual 3D blocks are connectable.

5. The information processing method according to claim 3, wherein the determining comprises determining a combination of connectable virtual 3D blocks from among the plurality of virtual 3D blocks, and the displaying comprises displaying information about the determined combination of the connectable virtual 3D blocks.

6. The information processing method according to claim 3, wherein the determining comprises determining whether or not an action of a pause of the unmanned flight vehicle is required between two of the two or more virtual 3D blocks in order to connect the two or more virtual 3D blocks selected from the plurality of virtual 3D blocks, and the displaying comprises displaying information as to whether or not the action of the pause is required.

7. The information processing method according to claim 3, wherein the determining comprises determining a combination of 3D blocks that are connectable without requiring an action of a pause of the unmanned flight vehicle from among the plurality of virtual 3D blocks, and the displaying comprises displaying information about the combination of the 3D blocks that are connectable without requiring the action of the pause.

8. The information processing method according to claim 3, wherein the determining comprises determining whether or not deformation of a trajectory of at least one of two 3D blocks selected from among the plurality of virtual 3D blocks is required in order to connect the two 3D blocks, and the displaying comprises displaying information as to whether or not the deformation is required.

9. The information processing method according to claim 3, wherein the determining comprises determining a combination of 3D blocks that are connectable without deformation from among the plurality of virtual 3D blocks, and the displaying comprises displaying information about the combination of the 3D blocks that are connectable without deformation.

10. The information processing method according to claim 3, wherein the determining comprises determining whether or not two 3D blocks selected from among the plurality of virtual 3D blocks are synthesizable, and the displaying comprises displaying information as to whether or not the two 3D blocks are synthesizable.

11. The information processing method according to claim 3, wherein the determining comprises determining a combination of synthesizable 3D blocks from among the plurality of virtual 3D blocks, and the displaying comprises displaying information about the combination of the synthesizable 3D blocks.

12. The information processing method according to claim 1, wherein the executing comprises executing the connection processing of the two or more virtual 3D blocks into a plurality of connected 3D blocks on a basis of the operation information.

13. The information processing method according to claim 12, wherein the connection processing includes processing of connecting one or more additional 3D blocks at a head or a tail of the plurality of connected 3D blocks.

14. The information processing method according to claim 12, wherein the connection processing includes processing of inserting one or a plurality of 3D blocks into the plurality of connected 3D blocks.

15. The information processing method according to claim 12, wherein the connection processing includes processing of deleting one or more virtual 3D blocks from the plurality of connected 3D blocks and then connecting remaining 3D blocks of the plurality of connected 3D blocks into a second plurality of connected 3D blocks.

16. The information processing method according to claim 1, wherein the executing comprises executing the synthesis processing of the two or more virtual 3D blocks on a basis of the operation information.

17. The information processing method according to claim 1, wherein the outputting comprises displaying a plurality of connected or synthesized 3D blocks in a virtual 3D space corresponding to a real space.

18. The information processing method according to claim 1, wherein the outputting comprises displaying a plurality of connected or synthesized 3D blocks in time series.

19. A non-transitory computer product containing an information processing program for causing one or a plurality of computers to perform operations comprising:

performing control of flight operations of an unmanned flight vehicle, the control of the flight operations comprising:

acquiring operation information of two or more virtual 3D blocks selected from a plurality of virtual 3D blocks, each of the plurality of virtual 3D blocks corresponding to a preset block-specific flight trajectory;

processing the two or more virtual 3D blocks of the plurality of virtual 3D blocks on a basis of the operation information to generate a flight path of the unmanned flight vehicle, the processing comprising one of connection processing or synthesis processing of the two or more virtual 3D blocks; and outputting information about the generated flight path.

20. An information processing device comprising:

circuitry configured perform control of flight operations of an unmanned flight vehicle the control of the flight operations comprising:

acquiring operation information of two or more virtual 3D blocks selected from a plurality of virtual 3D blocks, each of the plurality of virtual 3D blocks corresponding to a preset block-specific flight trajectory;

processing the two or more virtual 3D blocks of the plurality of virtual 3D blocks on a basis of the operation information to generate a flight path of the unmanned flight vehicle, the processing comprising one of connection processing or synthesis processing of the two or more virtual 3D blocks; and outputting information about the generated flight path.

* * * * *